(12) United States Patent
Nakamura

(10) Patent No.: US 11,088,525 B2
(45) Date of Patent: Aug. 10, 2021

(54) GROMMET, BATTERY PACK, AND ELECTRONIC APPARATUS

(71) Applicant: MURATA MANUFACTURING CO., LTD., Kyoto (JP)

(72) Inventor: Tsuyoshi Nakamura, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 325 days.

(21) Appl. No.: 16/175,345

(22) Filed: Oct. 30, 2018

(65) Prior Publication Data

US 2019/0123540 A1   Apr. 25, 2019

Related U.S. Application Data

(63) Continuation of application No. PCT/JP2017/016378, filed on Apr. 25, 2017.

(30) Foreign Application Priority Data

Jun. 16, 2016   (JP) .............................. JP2016-120276

(51) Int. Cl.
| | |
|---|---|
| *H02G 15/013* | (2006.01) |
| *H02G 3/08* | (2006.01) |
| *H01M 2/08* | (2006.01) |
| *H02G 3/22* | (2006.01) |
| *H01M 50/20* | (2021.01) |
| *H01M 50/183* | (2021.01) |

(52) U.S. Cl.
CPC ........ *H02G 15/013* (2013.01); *H01M 50/183* (2021.01); *H01M 50/20* (2021.01); *H02G 3/088* (2013.01); *H02G 3/22* (2013.01); *Y02E 60/10* (2013.01)

(58) Field of Classification Search
CPC .. H01M 50/183; H01M 50/20; H02G 15/013; H02G 3/088; H02G 3/22; Y02E 60/10
See application file for complete search history.

(56) References Cited

U.S. PATENT DOCUMENTS

| | | | |
|---|---|---|---|
| 3,791,875 A | * | 2/1974 | Koehler ................ H01M 50/20 |
| | | | 429/97 |
| 5,561,273 A | | 10/1996 | Yamanashi |
| 5,814,766 A | | 9/1998 | Striebel et al. |

(Continued)

FOREIGN PATENT DOCUMENTS

| | | |
|---|---|---|
| CN | 1868094 | 11/2006 |
| CN | 204795960 | 11/2015 |
| JP | S6420463 A | 1/1989 |

(Continued)

OTHER PUBLICATIONS

Chinese Office Action dated Dec. 18, 2019 in corresponding Chinese Application No. 201780030777.4.

(Continued)

*Primary Examiner* — Lingwen R Zeng
(74) *Attorney, Agent, or Firm* — K&L Gates LLP

(57) ABSTRACT

A grommet is provided. The grommet includes a pedestal and a wire fixing member configured to fix a wire, wherein each of the pedestal and the wire fixing member has at least one hole through which the wire is configured to be inserted, and the pedestal has a pool portion configured to accommodate a resin agent.

10 Claims, 27 Drawing Sheets

(56) References Cited

U.S. PATENT DOCUMENTS

2012/0236479 A1* 9/2012 Tamai ................ H01R 13/5816
361/679.01
2014/0008122 A1* 1/2014 Imahori ............... H01B 7/0045
174/77 R

FOREIGN PATENT DOCUMENTS

| JP | H07143646 A | 6/1995 |
| JP | H08500240 A | 1/1996 |
| JP | H0974646 A | 3/1997 |
| JP | H09259672 A | 10/1997 |
| JP | H11232948 A | 8/1999 |
| JP | H11354943 A | 12/1999 |

OTHER PUBLICATIONS

Japan Patent Office, International Search Report for Application No. PCT/JP2017/016378, dated Jun. 20, 2017.

* cited by examiner

GROMMET, BATTERY PACK, AND ELECTRONIC APPARATUS

CROSS REFERENCE TO RELATED APPLICATIONS

The present application is a continuation of PCT patent application no. PCT/JP2017/016378, filed on Apr. 25, 2017, which claims priority to Japanese patent application no. JP2016-120276 filed on Jun. 16, 2016, the entire contents of which are being incorporated herein by reference.

BACKGROUND

The present technology generally relates to a grommet, and more particularly to a grommet, a battery pack, and an electronic apparatus.

In the technical fields of electronic apparatuses, automobiles, etc., a grommet is typically used when wires (meaning that wires and wire harnesses being an assembled component formed by assembling a plurality of wires in a bundle are included, and the same applies to the following) are pulled out from a housing of a battery pack or the like.

For example, there is suggested a grommet in which a stress absorption portion is formed between a conduit portion and a grommet attachment portion, the stress absorption portion being formed by being folded back in a substantially U-shape in section, and the grommet attachment portion having a second stress absorbing portion formed by bending its one end radially inward in a substantially U-shape in section.

In addition, for example, there is suggested a water stopping grommet including a grommet body in a trumpet shape that is connected at its small diameter end to a cylindrical electric wire holding portion, the grommet body being provided in its inside with a water stopping agent filling chamber communicating with the electric wire holding portion to seal an inserted electric wire bundle by filling the water stopping agent filling chamber with a water stopping agent, wherein the electric wire holding portion has one end extending to the inside of the grommet body, the one end being connected to the water stopping agent filling chamber to form a space separating at least a wall portion of the grommet body on its small diameter side and a wall portion of the water stopping agent filling chamber in the grommet body.

Further, for example, there is suggested a wire fixing device that is provided with a pedestal for fixing an electric device, and that uses a grommet to attach and fix a lead wire connected to a terminal of the electric device, being pulled out toward the pedestal on a side where the electric device is not fixed, wherein the pedestal has a recess containing the grommet, and a resin agent is poured into the recess to be cured.

SUMMARY

In the conventional technology as described above, the grommets and the wire fixing device may not achieve improvement in fixing force of wires pulled out from a housing such as a battery pack, and in waterproof property of the housing such as a battery pack. Thus, further improvement in wire fixing force and a grommet in which waterproof property is improved are desired at present.

The present technology is made in light of the above-mentioned circumstances, and a main object thereof is to provide a grommet having excellent wire fixing force and excellent waterproof performance, and a battery pack and an electronic apparatus, including the grommet.

As a result of extensive research to solve the above-mentioned object, the present inventors has succeed in developing a grommet having excellent wire fixing force and excellent waterproof performance to reach completion of the present technology.

According to an embodiment of the present technology, a grommet is provided. The grommet includes a pedestal, and a wire fixing member configured to fix a wire, wherein each of the pedestal and the wire fixing member has at least one hole through which the wire is configured to be inserted, and the pedestal has a pool portion configured to accommodate a resin agent.

According to an embodiment of the present technology, the pool portion may include an outer trench.

According to another embodiment of the present technology, the grommet may include at least one protrusion through which the wire is configured to be inserted, and the protrusion may be formed on a second main surface opposite to a first main surface of the pedestal.

According to an embodiment of the present technology, the grommet may include a waterproof member, and the waterproof member may be disposed in a periphery of a second main surface opposite to a first main surface of the pedestal.

According to an embodiment of the present technology, the pedestal may include at least one holding member configured to hold the wire, and the at least one holding member may be provided around the at least one hole of the pedestal.

Each of the pedestal and the wire fixing member may include a hard material.

According to an embodiment of the present technology, the wire fixing member may include a first cover member configured to cover the pool portion.

According to an embodiment of the present technology, the wire fixing member may include a second cover member configured to cover the pool portion, and the second cover member includes an opening through which the resin agent is configured to be poured.

According to an embodiment of the present technology, the wire fixing member may include a third cover member configured to cover the pool portion, and the pedestal and the third cover part are integrally molded as an integrally molded body. The integrally molded body may have an opening through which the resin agent is configured to be poured.

According to an embodiment of the present technology, the wire fixing member may include at least one supporting structure configured to support the wire.

According to an embodiment of the present technology, a battery pack is provided. The battery pack includes at least a battery cell and a battery pack case accommodating the battery cell. The battery pack case has a lead-out hole for leading out a wire, in which a grommet is disposed. The grommet includes a pedestal, and a wire fixing member configured to fix a wire, each of the pedestal and the wire fixing member has at least one hole through which the wire is configured to be inserted. The pedestal has a pool portion configured to accommodate a resin agent.

In the battery pack according to an embodiment of the present technology, the pool portion may have an outer trench.

In the battery pack according an embodiment of to the present technology, the grommet may include at least one protrusion through which the wire is configured to be inserted, and the protrusion may be formed on a second main surface opposite to a first main surface of the pedestal.

In the battery pack according to an embodiment of the present technology, the grommet may include a waterproof member that may be disposed in a periphery of a second main surface opposite to a first main surface of the pedestal, and the waterproof member may be interposed between the grommet and the battery pack case.

In the battery pack according an embodiment of to the present technology, the pedestal may include at least one holding member configured to hold the wire, and the at least one holding member may be provided around the at least one hole of the pedestal.

In the battery pack according to an embodiment of the present technology, each of the pedestal and the wire fixing member may include a hard material.

In the battery pack according to an embodiment of the present technology, the wire fixing member may include a first cover member configured to cover the pool portion.

In the battery pack according to an embodiment of the present technology, the wire fixing member may include a second cover member configured to cover the pool portion, and the second cover member includes an opening through which the resin agent is configured to be poured.

In the battery pack according to an embodiment of the present technology, the wire fixing member may include a third cover member configured to cover the pool portion, and the pedestal and the third cover member are integrally molded as an integrally molded body. The integrally molded body may have an opening through which the resin agent is configured to be poured.

In the battery pack according to an embodiment of the present technology, the wire fixing member may include at least one supporting structure configured to support the wire.

In addition, the present technology provides an electronic apparatus including the battery pack according to an embodiment of the present technology as a power supply source.

Further, the present technology provides the following: an electric vehicle including the battery pack according to an embodiment of the present technology, a converter configured to convert electric power supplied from the battery pack into driving force, a driver configured to drive in accordance with the driving force, and a controller configured to control a usage state of the battery pack;

an electric power storage system including the battery pack according to an embodiment of the present technology, one or more electric apparatuses to which power is supplied from the battery pack, and a controller configured to control power supply from the battery pack to the electric devices; and an electric tool including the battery pack according to an embodiment of the present technology, and a movable part to which electric power is configured to be supplied from the battery pack.

The present technology provides a grommet having excellent wire fixing force and excellent waterproof performance, and a battery pack and an electronic apparatus, including the grommet.

The effects described above are not necessarily limited, and other suitable properties relating to the present technology may be realized and as further described

DETAILED DESCRIPTION

Figure 1:
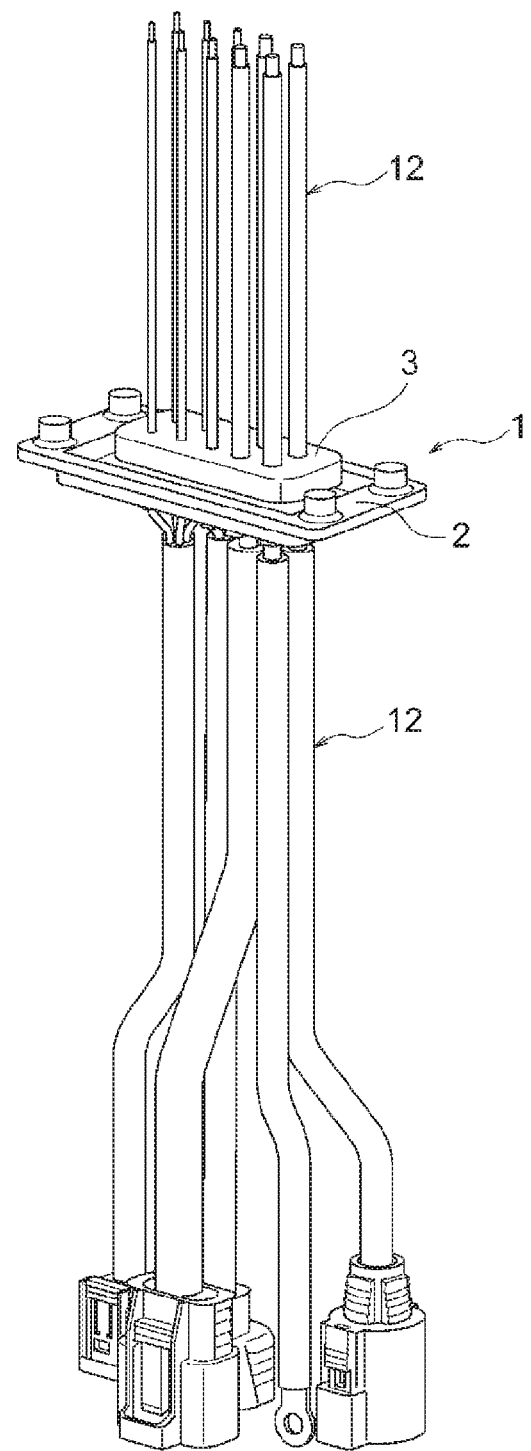
FIG. 1 is a perspective view of a grommet according to a first embodiment of the present technology.

The present technology generally relates to a grommet, and more particularly to a grommet, a battery pack, and an electronic apparatus.

As described herein, the present disclosure will be described based on examples with reference to the drawings, but the present disclosure is not to be considered limited to the examples, and various numerical values and materials in the examples are considered by way of example.

The outline of the present technology will be described.

First, a general grommet and a wire fixing device will be described.

The grommet is attached to fix a wire and protect the wire against water and dust when the wire is pulled out from a housing of a battery pack or the like. The wire fixing device has a mounting pedestal made of a hard material, and is attached using a through hole of a housing a battery pack or the like.

The grommet is made of a soft material such as rubber or elastomer, and may be configured such that a hole for attaching a wire is provided for each wire, or may be configured such that a plurality of wires is bundled up to be attached through one hole.

When a hole for attaching a wire is provided for each wire, the grommet is configured to achieve waterproof on the circumference of coating of the wire by press-fitting the wire into the hole of the grommet. Thus, a grommet with high waterproof property causes assembling work to be not easy. When a wire bundle with a plurality of wires is attached, the wires are inserted into the grommet after being bundled up and a sealant is then poured to protect the wires together against water. This makes it difficult to cause the sealant to be evenly and uniformly provided to seal a clearance between respective wires, so that waterproof performance may be unstable.

When the grommet body is made of a soft material, a clearance may be formed between a wire and a wire attachment hole of the grommet due to bending, twisting, or the like of the wire, and the grommet itself also may be deformed with respect to the through hole of the housing. This may cause ingress of water.

Waterproof structure between the grommet made of a soft material and a housing to which the grommet is attached depends on a squeezing amount of the grommet and the through-hole of the housing, so that the waterproof structure with high waterproof property may unfortunately cause assembling work of the grommet into the housing to be hard and difficult.

The wire fixing device includes a recess for pouring a resin agent into the mounting pedestal made of a hard material, and the resin agent is cured together with the grommet and a wire passing through the pedestal in the recess to achieve waterproof on the circumference of coating of the wire. However, it can be imagined that the side on which the resin agent is poured is an exposed side to be an external appearance surface, so that the resin agent is exposed in appearance to impair a design property.

The recess into which the resin agent is poured has a pool-like shape, so that a small amount of the resin agent poured into the recess may deteriorate waterproof performance. Meanwhile, when a large amount of the resin agent is poured into the recess, the resin agent overflows onto a pedestal face to cause a problem of a dirty appearance, thereby causing control of the pouring amount to be difficult.

In addition, when the resin agent is cured together with a plurality of wires, there is no structure for maintaining an interval between the wires at an appropriate interval in the recess. As a result, the wires may be close to each other or brought into contact with each other to cause the resin agent to be cured while a thickness of the resin agent between the wires does not reach a required thickness, so that required waterproof function may not be obtained.

The present technology is based on the above-mentioned circumstances, and is configured to obtain excellent wire fixing force and excellent waterproof performance by using a grommet including a pedestal, and a wire fixing portion for fixing a wire, wherein each of the pedestal and the wire fixing portion has at least one hole through which the wire is inserted, and the pedestal has a pool portion into which a resin agent is poured and cured.

When the grommet according to the present technology is disposed in a battery pack case provided in a battery pack, waterproof property of the battery pack can be improved while the wire fixing force is increased. This enables contribution to improvement and maintenance of excellent battery characteristics of the battery pack. The grommet according to the present technology may be applied not only to a battery pack but also to an article such as a housing used in an electronic apparatus, an automobile, or the like.

The battery pack includes one or more battery blocks each including a battery holder in which a plurality of batteries such as lithium-ion batteries is held, the one or more battery blocks being housed in the battery pack case (exterior case). This battery pack is used in a personal computer, an electronic apparatus such as a portable communication terminal, a vehicle mounting an electric motor as a driving source, and an electric machine such as a rammer and a lawn mower.

With reference to FIGS. 1 to 6, a grommet 1 of the first embodiment (example of grommet) according to the present technology will be described.

The grommet 1 includes a pedestal 2 and a first cover member 3 as a wire fixing member for fixing wires 12. The pedestal 2 has a plurality of holes 5 through which the respective wires 12 are inserted. The first cover member 3 has a plurality of holes 6 through which the respective wires 12 are inserted. The pedestal 2 includes a pool portion 4 into which a resin agent 8 is poured and cured.

Figure 2A:
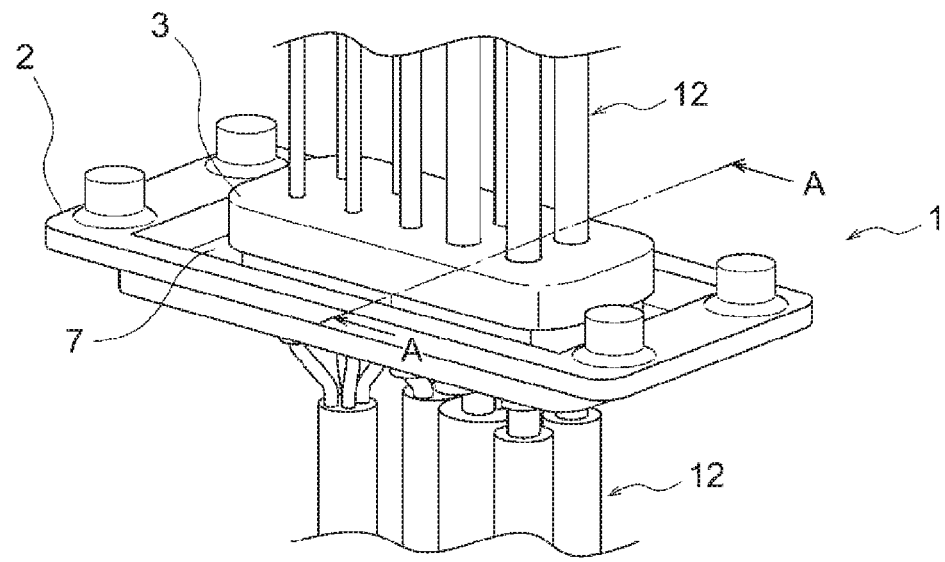
FIGS. 2A and 2B are enlarged perspective views of the grommet according to the first embodiment of the present technology.
Figure 2B:
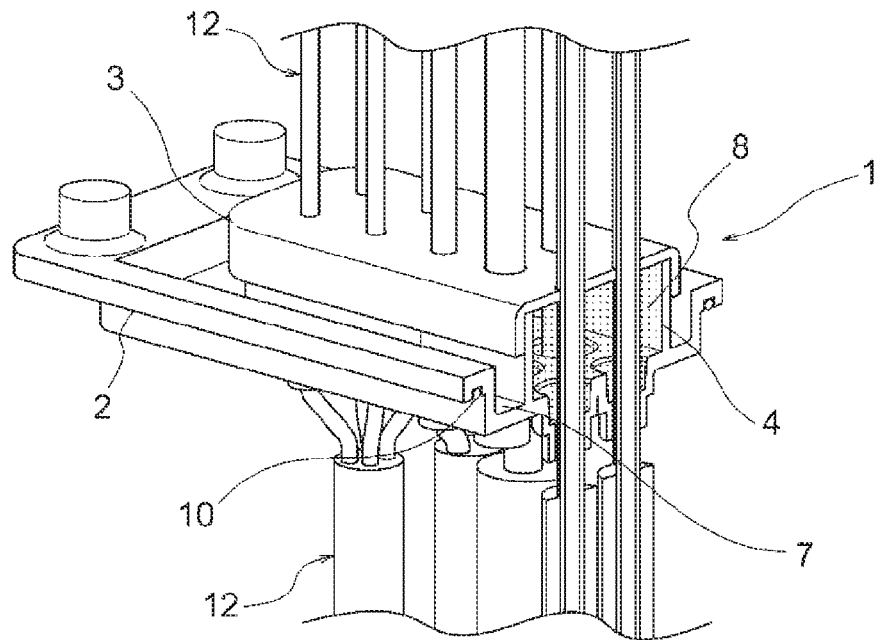

FIG. 1 is a perspective view of the grommet 1 through which the wires 12 are inserted, and FIG. 2(a) is an enlarged perspective view of the grommet 1 through which the wires 12 are inserted. FIG. 2(b) is a sectional perspective view taken along line A-A illustrated in FIG. 2(a).

As illustrated in FIGS. 1 and 2, the grommet 1 fixes the wires 12 with the pedestal 2 and the first cover member 3 by allowing an upper portion of the pool portion 4 to be covered with the first cover member 3 until the resin agent 8 is cured. This enables preventing uneven thickness of the resin agent 8 caused when the wires 12 are close to each other or brought into contact with each other, so that the grommet 1 has structure capable of achieving waterproof between the wires 12 to enable its waterproof performance to be stable.

The grommet 1 includes the pedestal 2 in which the pool portion 4 is provided with an outer trench 7 to receive the resin agent 8 overflowing to an outer periphery of the pedestal 2 such that no problem is caused in view of manufacturing feasibility and appearance (design property). As a result, the wires 12 inserted into the respective holes 5 can be sealed with the resin agent 8 in the pool portion 4 to prevent ingress of water. This enables labor saving in work requiring force, such as pressing a wire into a rubber grommet, for example, so that work efficiency can be improved.

Figure 5:
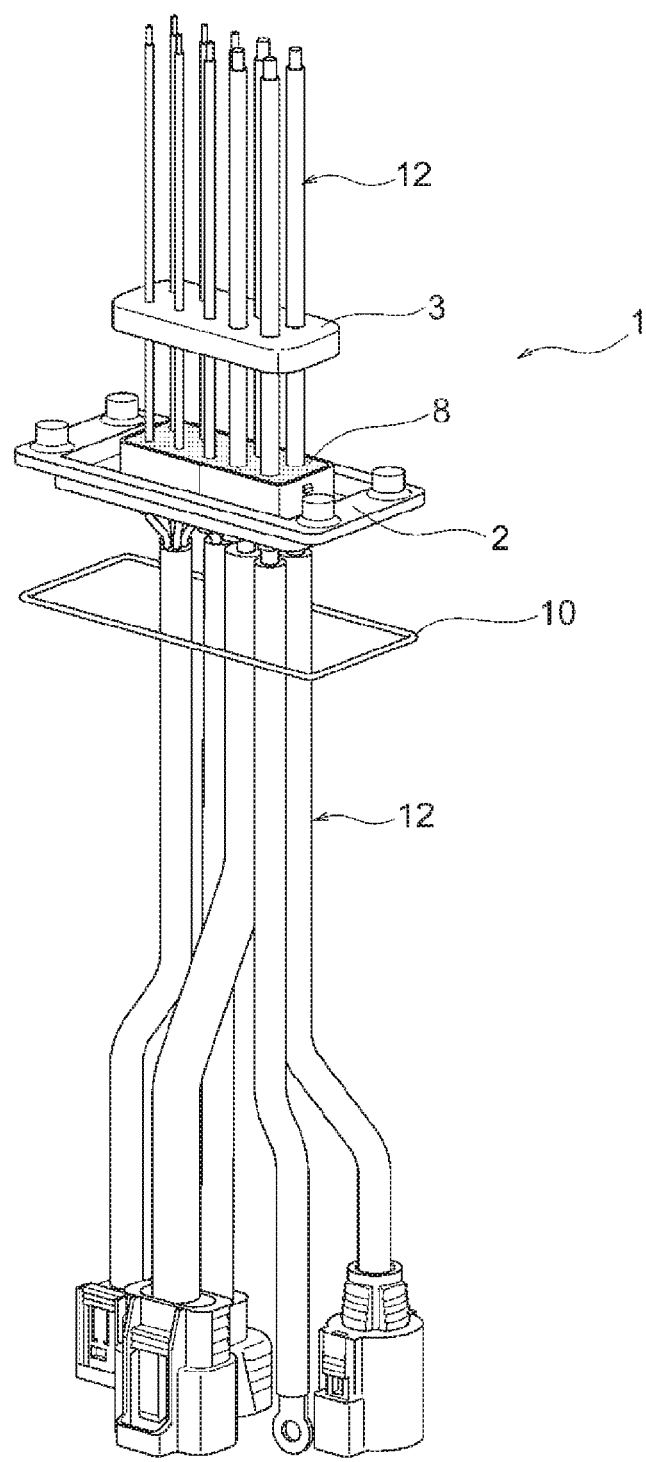
FIG. 5 is an exploded perspective view of the grommet according to the first embodiment of the present technology.
Figure 6:
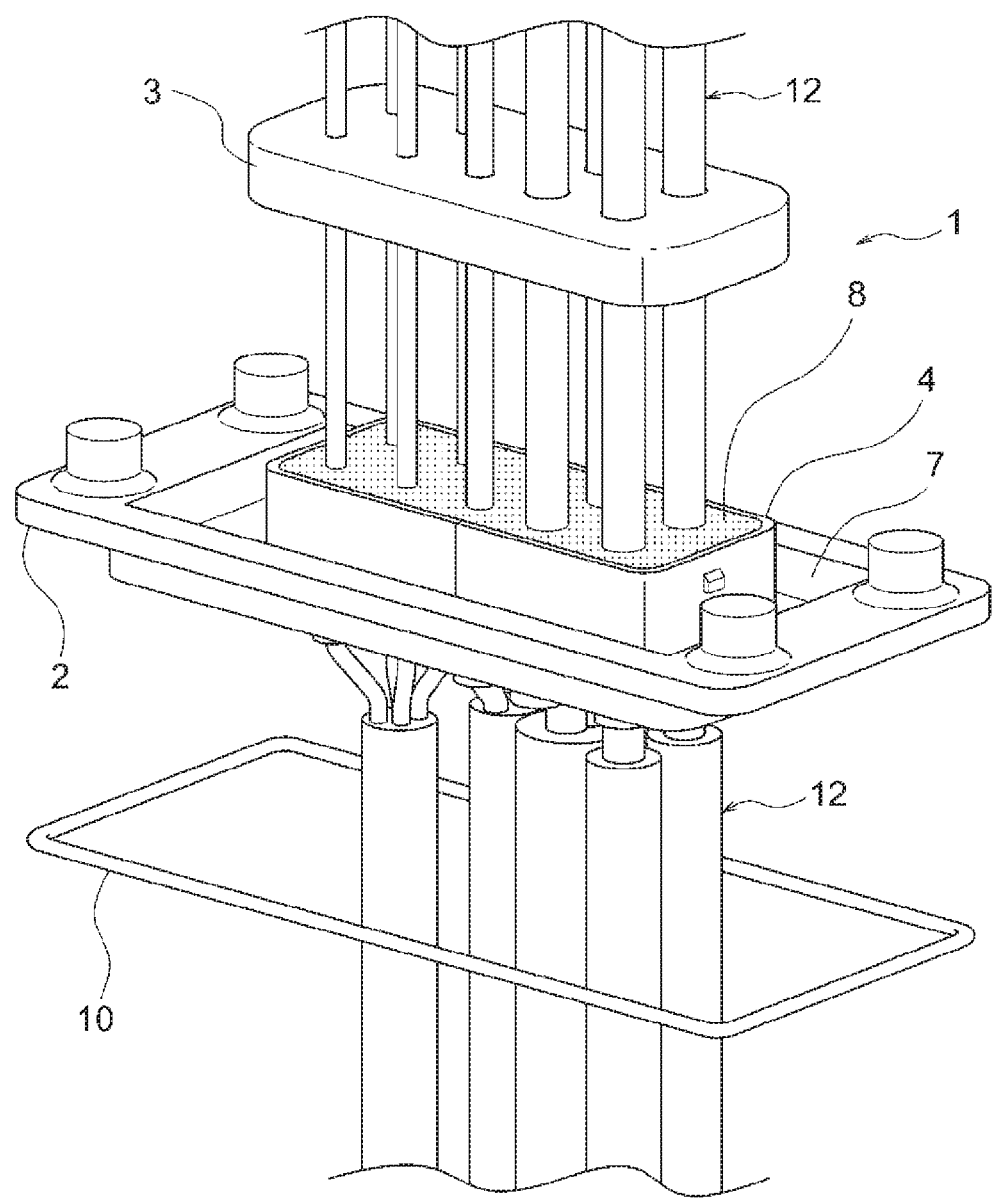
FIG. 6 is an exploded and enlarged perspective view of the grommet according to the first embodiment of the present technology.

FIG. 5 is an exploded perspective view of the grommet 1 through which the wires 12 are inserted, and FIG. 6 is an exploded and enlarged perspective view of the grommet 1 through which the wires 12 are inserted.

As illustrated in FIGS. 5 to 6, while the wires 12 are erected, the wires 12 are inserted into the respective holes 5 of the pedestal 2, each having a minimum clearance. To prevent ingress of water through a clearance between each of the wires 12 and the corresponding one of the holes 5, the resin agent 8 is poured into the pool portion 4. Then, the wires 12 are inserted into the respective holes 6 of the first cover member 3 after the resin agent 8 is poured, so that the pool portion 4 of the pedestal 2 is covered with the first cover member 3. As a result, each of the wires 12 is fixed at two places by the pedestal 2 and the first cover member 3 while a predetermined distance between the wires 12 is maintained, so that the grommet 1 enables each of the wires 12 to be stably maintained in shape by preventing the wires 12 from being close to each other or being brought into contact with each other until the resin agent 8 is cured. In addition, an O-ring 10 having a waterproof function is disposed in a peripheral portion of a second main surface 2b opposite to a first main surface 2a of the pedestal 2 in which the pool portion 4 is formed.

While the pedestal 2 and the first cover member 3 provided in the grommet 1 are not particularly limited in material and may be formed of any material, each of them is preferably formed of a hard material such as a plastic material. The plastic material includes polycarbonate (PC), polyethylene terephthalate (PET), polyethylene naphthalate (PEN), polyethylene ether ketone (PEEK), polybutylene terephthalate (PBT), polyamide (PA), liquid crystal polymer (LCP), and the like, for example.

When a hard material such as a plastic material is used for the pedestal 2 and the first cover member 3, rigidity can be applied to the pedestal 2 and the first cover member 3 to enable ingress of water caused by deformation due to external force to be further prevented. The second main surface 2b of the pedestal 2 is positioned on the outer side of (design surface side) of the housing of the battery pack or the like. Thus, when the pedestal 2 is formed of a hard material such as a plastic material, the pedestal 2 is excellent in design because there is no deformation by external force.

To further assure ease of assembling of the wires 12 into a housing of a battery pack 601 or the like and the wire fixing force (holding force) against bending, twisting, and the like of each of the wires 12, it is preferable that the pedestal 2 and the first cover member 2 are each made of a hard material such as a plastic material.

It is preferable that the holes 5 of the pedestal 2 and the holes 6 of the first cover member 3 each have a minimum clearance for easily inserting the wires 12 into the corresponding holes. When the holes 5 and the holes 6 each have the minimum clearance, an effect of fixing the wires 12 and a waterproof effect are further achieved. As a result, the resin agent 8 does not overflow, so that each of the wires 12 does not need to be tightened with an elastic body such as rubber for waterproofing, thereby further facilitating the assembling work.

Figure 3A:
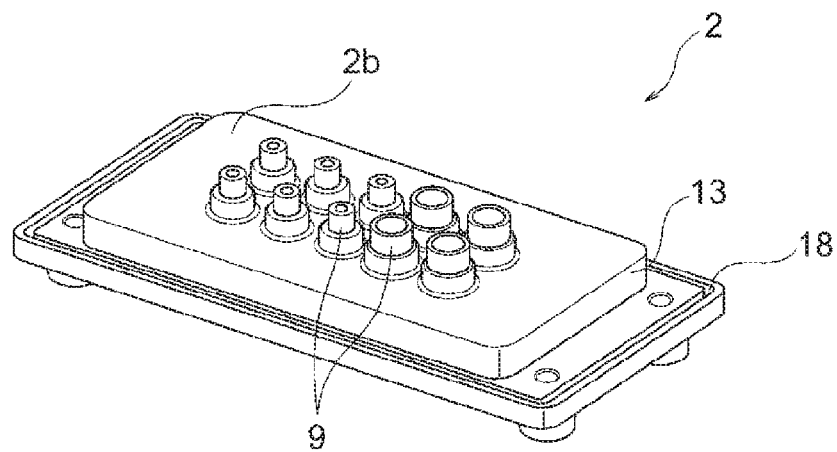
FIGS. 3A, 3B, and 3C are perspective views of a pedestal provided in the grommet according to the first embodiment of the present technology.
Figure 3B:
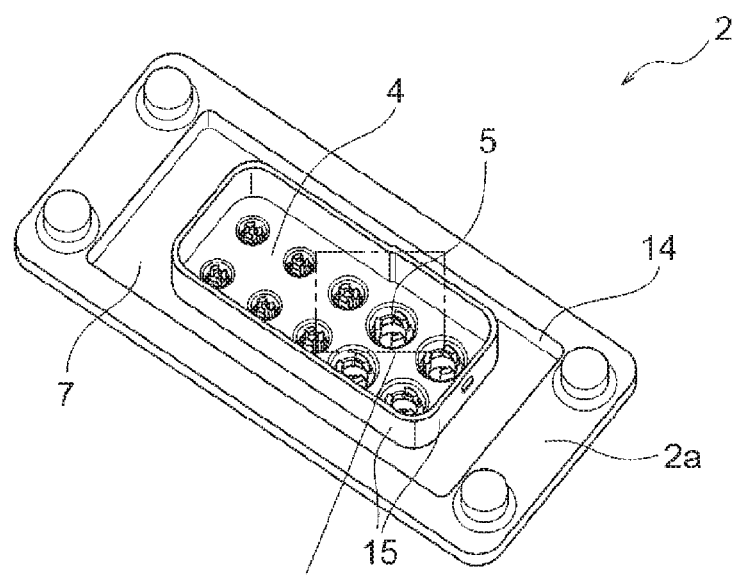
Figure 3C:
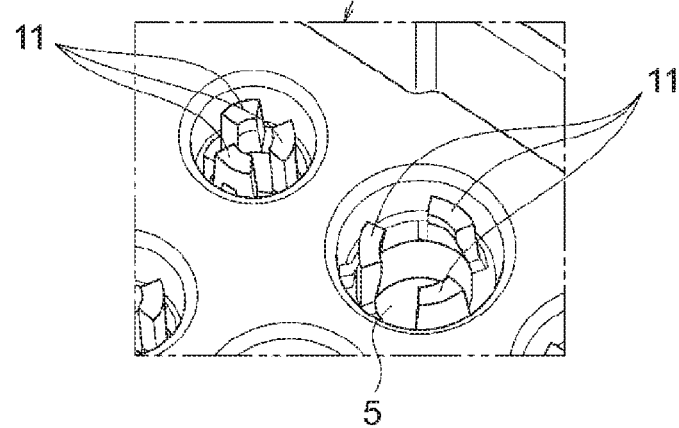

With reference to FIG. 3, the pedestal 2 provided in the grommet 1 will be described. FIG. 3(a) is a perspective view of the pedestal 2 on its second main surface 2b side. FIG. 3(b) is a perspective view of the pedestal 2 on its first main surface 2a side. FIG. 3(c) is an enlarged view of a part of the plurality of holes 5 of the pedestal 2.

As illustrated in FIGS. 3(a) and 3(b), the pedestal 2 has the first main surface 2a and the second main surface 2b, each of which has a substantially rectangular shape. The first main surface 2a and the second main surface 2b are positioned on respective opposite sides, and are in a front-back relationship. The second main surface 2b has a tabular protruding portion 13. The tabular protruding portion 13 is provided with a plurality of protrusions 9 thereon. Details of the plurality of projections 9 will be described below. The second main surface 2b is also provided in its peripheral portion (a portion on the second main surface 2b, other than the tabular protruding portion 13) with a peripheral recessed portion 18 for disposing the O-ring 10 being a waterproof member therein.

The first main surface 2a has a tabular recessed portion 14. The tabular recessed portion 14 is provided with the pool portion 4 allowing the resin agent 8 to be poured thereinto, and the outer trench 7. The pool portion 4 has a substantially rectangular shape, and includes side surface plates 15 for partitioning the pool portion 4, provided in a direction perpendicular to the first main surface 2a. The outer trench 7 is formed outside the side surface plates 15, or on an outer peripheral side of the pool portion 4. The pool portion 4 is provided in its longitudinal direction with five holes 5 for inserting the respective wires 12, and in its lateral direction with two holes 5 for inserting the respective wires 12. That is, the pool portion 4 is provided with the ten holes 5. The number of the holes 5 illustrated in FIG. 3(b), which is ten, is only an example, and the number of the holes 5 is optionally changed according to the number of wires.

As illustrated in FIG. 3(c), a resin spring 11 is provided around the hole 5 as a holding member for holding the wire 12. Details of the resin spring 11 will be described below.

Figure 4A:
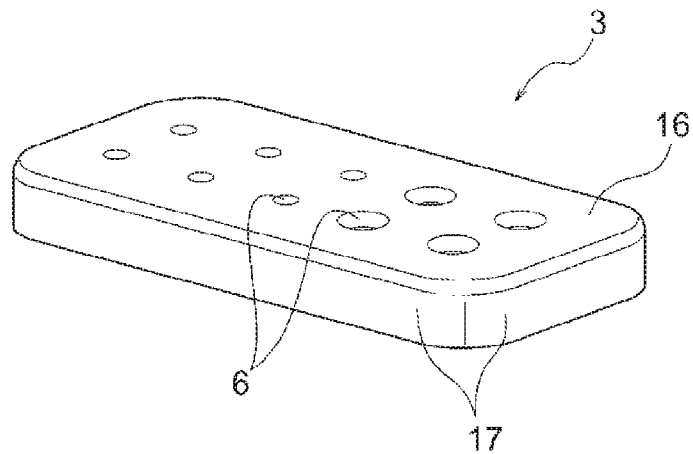
FIGS. 4A and 4B are perspective views of a first cover member (wire fixing member) provided in the grommet according to the first embodiment of the present technology.
Figure 4B:
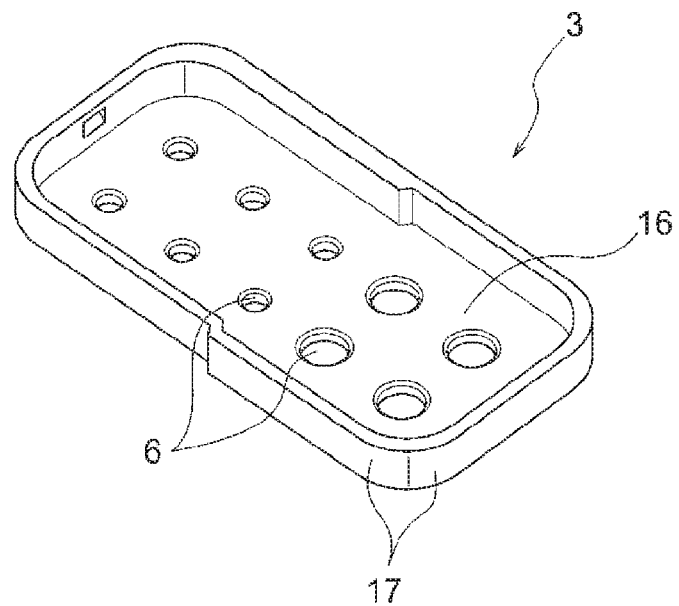

With reference to FIG. 4, the first cover member 3 provided in the grommet 1 will be described. FIG. 4(a) is a perspective view of the first cover member 3 on its front surface side. FIG. 4(b) is a perspective view of the first cover member 3 on its back surface side.

As illustrated in FIGS. 4(a) and 4(b), the first cover member 3 includes a flat plate (bottom plate) 16 for covering the pool portion 4, and side surface plates 17 provided in a direction perpendicular to the flat plate (bottom plate) 16. The side surface plates 17 enable the first cover member 3 to be fixed to the pedestal 2. The flat plate (bottom plate) 16 is provided in its longitudinal direction with five holes 6 for inserting the respective wires 12, and in its lateral direction with two holes 6 for inserting the respective wires 12. That is, the first cover member 3 is provided with the ten holes 6. The number of the holes 6 illustrated in FIGS. 4(a) and 4(b), which is ten, is only an example, and the number of the holes 6 is optionally changed according to the number of wires.

The ten holes 5 are disposed in the pool portion 4 to substantially align with the corresponding ten holes 6 disposed in the flat plate (bottom plate) 16 such that each of ten wires 12 does not twist or bend when the ten wires 12 are inserted into the respective holes 5 of the pedestal 2, and subsequently inserted into the respective holes 6 of the first cover member 3.

The resin agent 8 is poured into the pool portion 4 and cured. The resin agent 8 is not particularly limited as long as it can be cured, and examples thereof include epoxy resin, hot melt, urethane resin and the like. The resin agent 8 can be prevented from leaking from the pedestal 2, the first cover member 3, and the like when flowing into the pool portion 4 by adjusting its flowability.

With reference to FIG. 3(a), five protrusions 9 are formed on the tabular protruding portion 13 for each row in its longitudinal direction and two protrusions 9 are formed on the tabular protruding portion 13 for each row in its lateral direction (a total of ten protrusions 9). Each of the protrusions 9 has a hole through which the wire 12 is inserted. The hole decreases in size from right to left in the longitudinal direction in the drawing, according to a thickness of the inserted wire 12. The protrusion 9 has a substantially cylindrical shape when the wire 12 has a large thickness. As the wire 12 decreases in thickness, the shape becomes substantially conical. The number of the protrusions 9 is optionally changed according to the number of wires. The protrusion 9 may be formed integrally with the pedestal 2, and made of a hard material identical to that of the pedestal 2, for example. Alternatively, the protrusion 9 may be formed separately from the pedestal 2, and made of a rubber material different from the hard material of the pedestal 2, for example.

The protrusion 9 enables not only the wire 12 to be held but also the amount of deformation of bending generated in the wire 12 to be less likely to be transmitted to a portion cured by the resin agent 8, so that ingress of water through the circumference of the hole through which the wire is inserted (e.g., the hole 5 of the pedestal 2, the hole 6 of the first cover member 3, etc.) due to bending of the wire can be prevented unlike a conventional technology. While the resin agent 8 is injected between the pedestal 2 and the first cover member 3, the resin agent 8 is less likely to be deformed in a bending or twisting direction of the wire 12 by providing the protrusion 9 to cause bending, twisting, and the like of the wire 12 due to external force to be less likely to be transmitted to the resin agent existing inside a housing such as a battery pack case 602 or the like. As a result, a stable waterproof effect can be obtained.

The O-ring 10, which is a waterproof member, is disposed in the peripheral recessed portion 18 of the pedestal 2. Assembling of the grommet 1 and a housing like the battery pack case 602 or the like is facilitated by disposing the O-ring 10 in the peripheral recessed portion 18.

The material of the O-ring 10 is not particularly limited and may be any material as long as it can be elastically deformed. Thus, the O-ring 10 includes a rubber material such as natural rubber, synthetic natural rubber, silicon, isoprene rubber, butadiene rubber, styrene rubber, styrene butadiene rubber, butyl rubber, ethylene-propylene rubber, nitrile rubber, chlorosulfonated polyethylene rubber, acrylic rubber, urethane rubber, silicone rubber, fluorine rubber, polysulfide rubber, and the like. When the O-ring 10 is made of the rubber material containing inorganic filler, a waterproof effect thereof can be increased. This kind of inorganic filler includes silica, alumina, calcium carbonate, titanium oxide, mica, zeolite, active carbon, and the like.

Other than the O-ring 10, the waterproof member may be any material as long as it can improve the waterproof property, and thus a sheet-like soft rubber may be used, for example.

The resin spring 11 is provided around the each of the holes 5 of the pedestal 2 as a holding member for holing the wire 12. While the resin spring 11 is formed of three protruding pieces with reference to FIG. 3(c), the number of protruding pieces may be increased or decreased depending on a thickness of the wire 12, strength of the wire holding force, and the like. The holding member is not limited to the resin spring 11 as long as it can hold the wire, and may be a metal spring, for example.

The resin spring 11 temporarily holds the wire 12 until the resin agent 8 is cured so that a length of the wire 12 to be exposed from the pedestal 2 can be determined. While the resin spring 11 is provided around each of the holes 5 of the pedestal 2, the resin spring 11 may be provided in the wire fixing member, or around each of the holes 6 of the first cover member 3, for example.

With reference to FIGS. 7 to 12, a grommet 101 according to the second embodiment (modified example 1 of the grommet) of the present technology will be described.

The grommet 101 includes a pedestal 102, and a second cover member 103 having an opening 119 into which the resin agent 8 is poured, as a wire fixing member for fixing the wire 12. The pedestal 102 has a plurality of holes 105 through which the respective wires 12 are inserted. The second cover member 103 has a plurality of holes 106 through which the respective wires 12 are inserted. The pedestal 102 includes a pool portion 104 into which the resin agent 8 is poured and cured.

Figure 7:
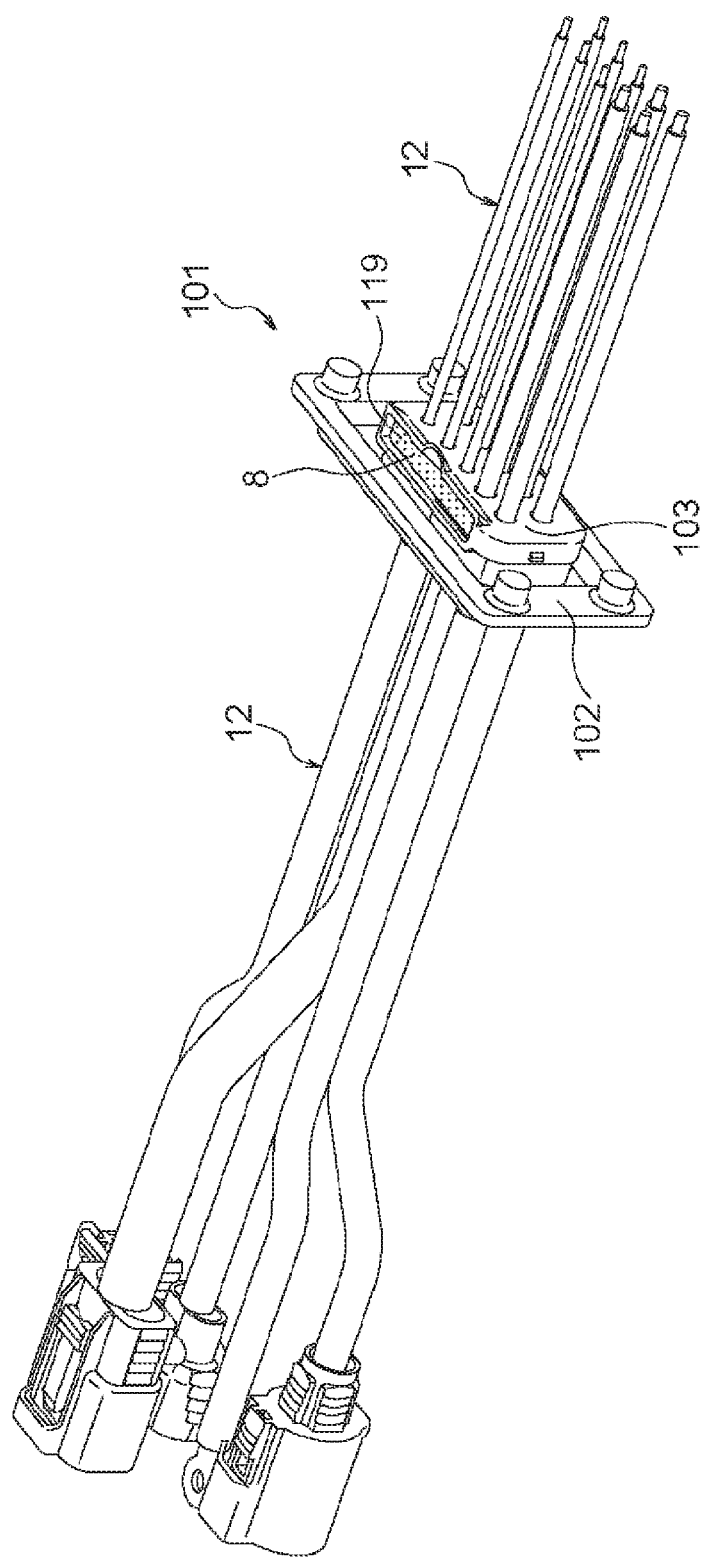
FIG. 7 is a perspective view of a grommet according to a second embodiment of the present technology.
Figure 8A:
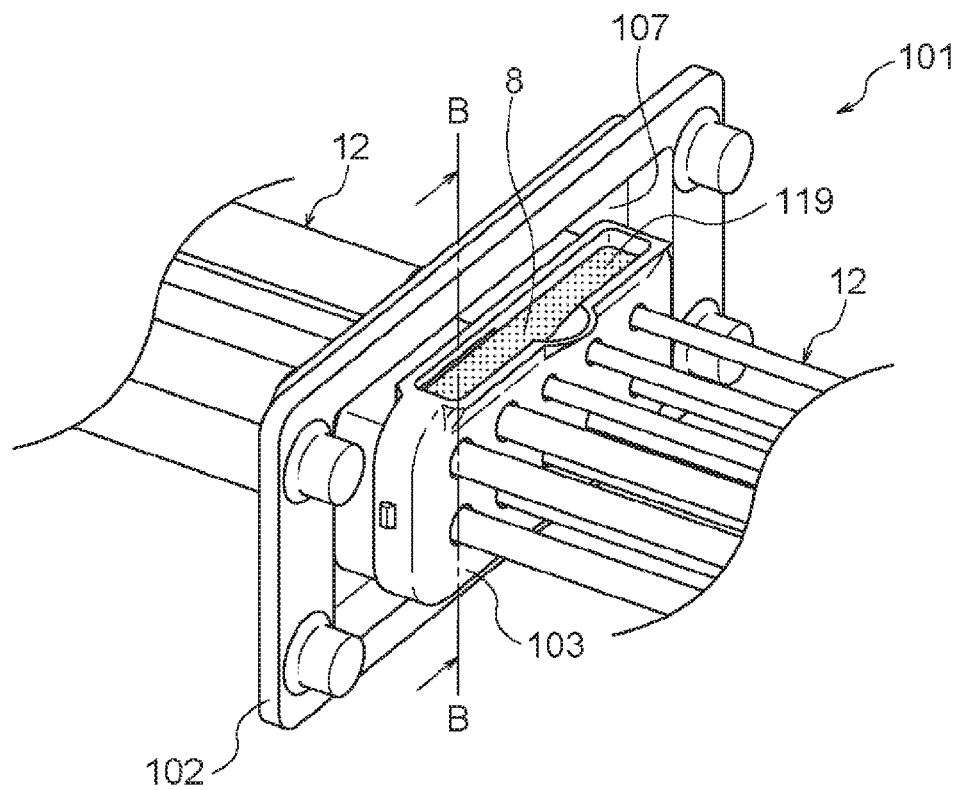
FIGS. 8A and 8B are enlarged perspective views of the grommet according to the second embodiment of the present technology.
Figure 8B:
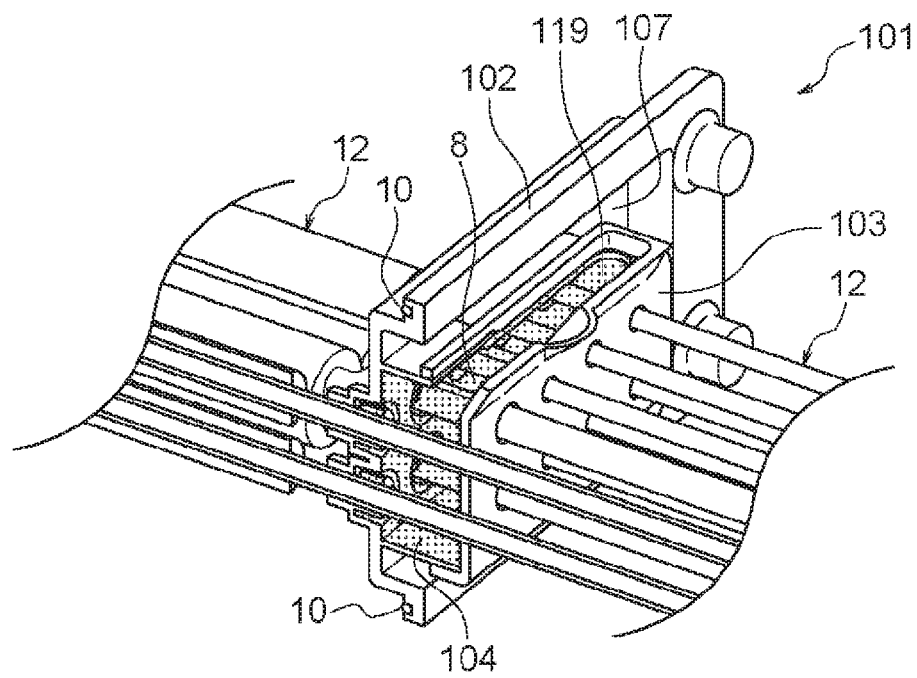

FIG. 7 is a perspective view of the grommet 101 through which the wires 12 are inserted, and FIG. 8(a) is an enlarged perspective view of the grommet 101 through which the wires 12 are inserted. FIG. 8(b) is a sectional perspective view taken along line B-B illustrated in FIG. 8(a).

As illustrated in FIGS. 7 and 8, the grommet 101 fixes the wires 12 with the pedestal 102 and the second cover member 103 by allowing an upper portion of the pool portion 104 to be covered with the second cover member 103 until the resin agent 8 is cured. This enables preventing uneven thickness of the resin agent 8 caused when the wires 12 are close to each other or brought into contact with each other, so that the grommet 101 has structure capable of achieving waterproof between the wires 12 to enable its waterproof performance to be stable.

The grommet 101 includes the pedestal 102 in which the pool portion 104 is provided with an outer trench 107 to receive the resin agent 8 poured from the opening 119, overflowing to an outer periphery of the pedestal 102, such that no problem is caused in view of manufacturing feasibility and appearance (design property). As a result, the wires 12 inserted into the respective holes 105 can be sealed with the resin agent 8 in the pool portion 104 to prevent ingress of water. This enables labor saving in work requiring force, such as pressing a wire into a rubber grommet, for example, so that work efficiency can be improved.

Figure 11:
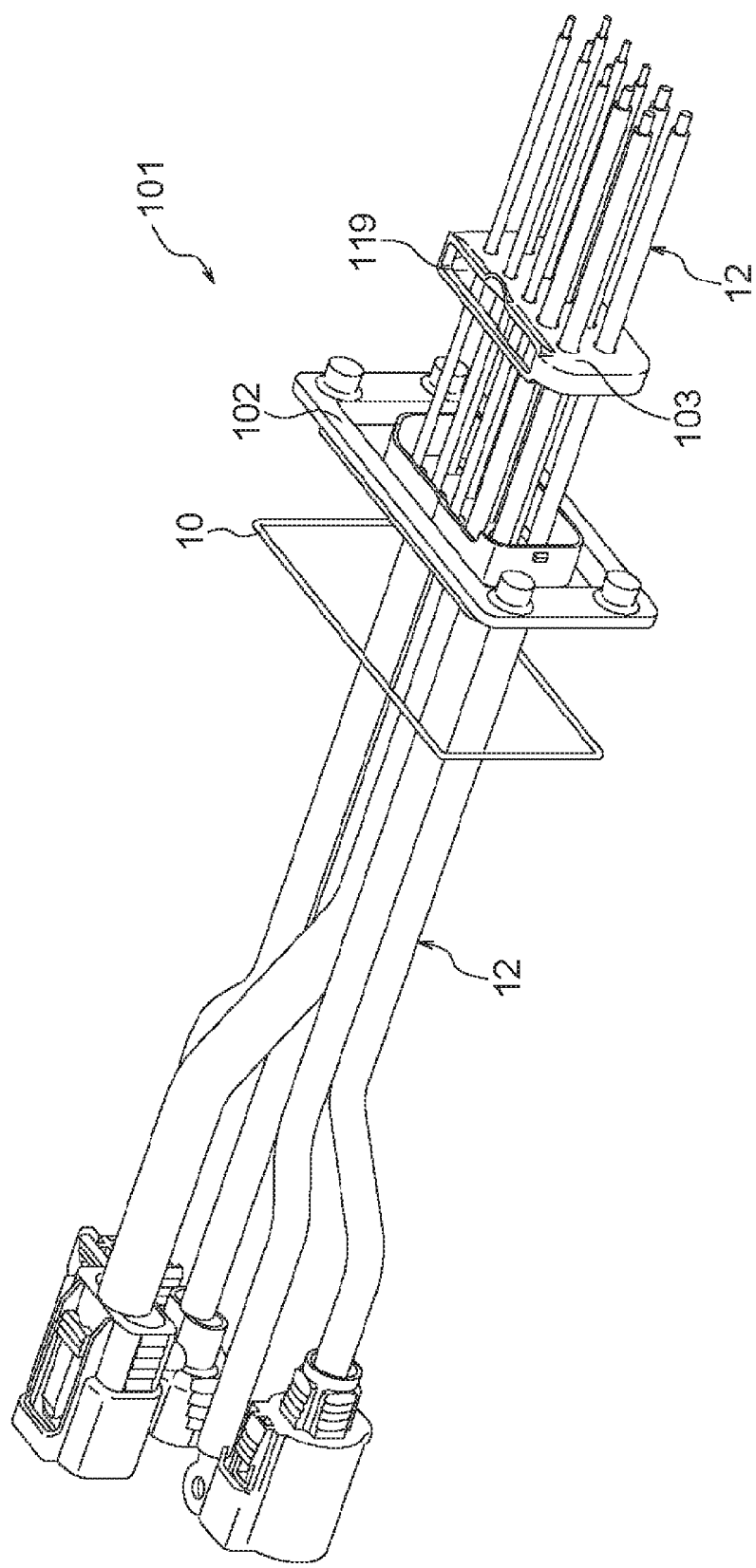
FIG. 11 is an exploded perspective view of the grommet according to the second embodiment of the present technology.
Figure 12:
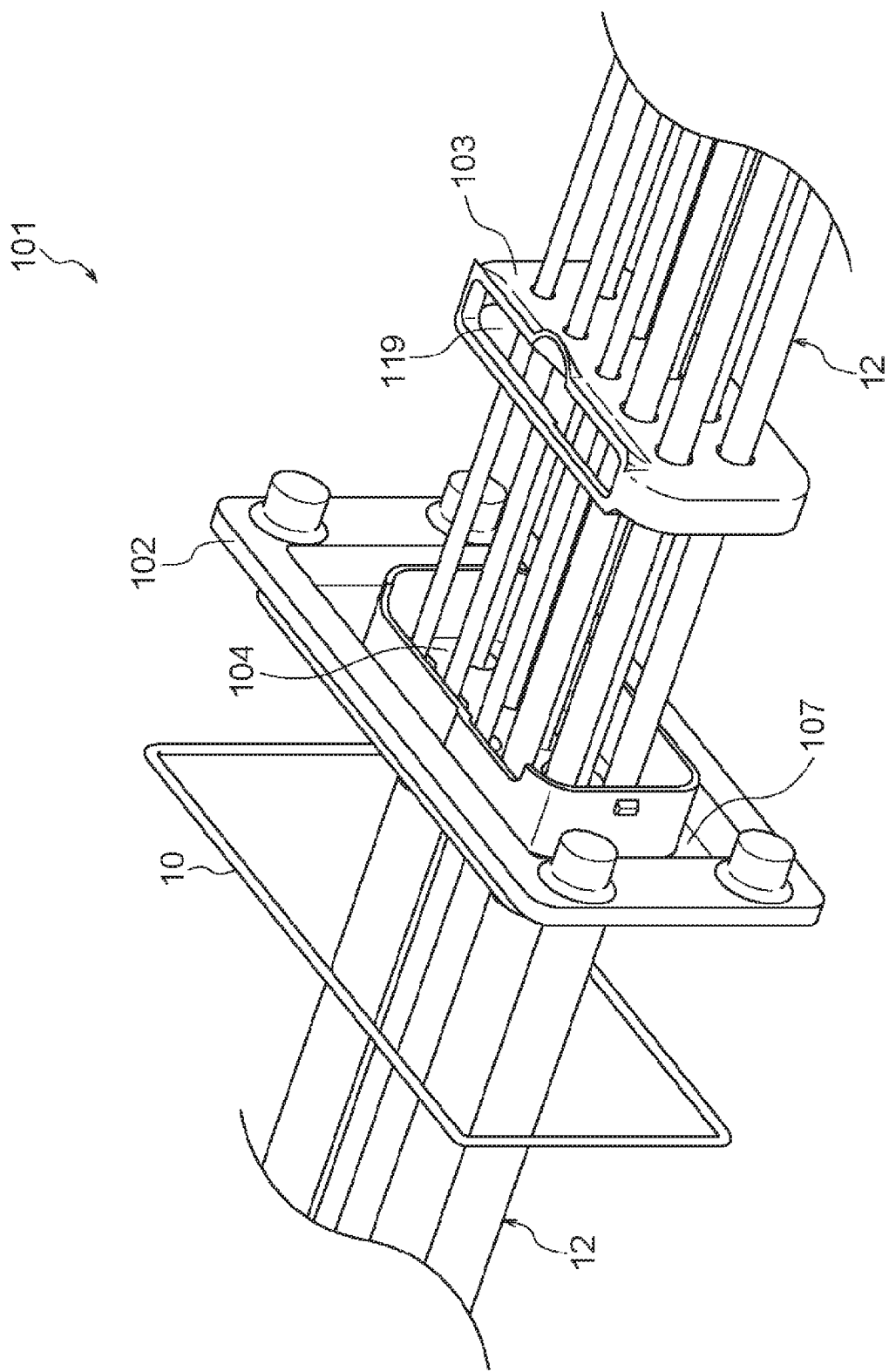
FIG. 12 is an exploded and enlarged perspective view of the grommet according to the second embodiment of the present technology.

FIG. 11 is an exploded perspective view of the grommet 101 through which the wires 12 are inserted, and FIG. 12 is an exploded and enlarged perspective view of the grommet 101 through which the wires 12 are inserted.

As illustrated in FIGS. 11 and 12, while the wires 12 are laid, the wires 12 are inserted into the respective holes 105 of the pedestal 102, each having a minimum clearance. Subsequently, the wires 12 are inserted into the respective holes 106 of the second cover members 103, each having a minimum clearance, to fix the wires 12 with the pedestal 102 and the second cover member 103. Then, the resin agent 8 is poured from the opening 119 formed by the pedestal 102 and the second cover member 103. As a result, the grommet 101 enables each of the wires 12 to be stably maintained in shape by preventing the wires 12 from being close to each other or being brought into contact with each other until the resin agent 8 is cured. While the wires 12 are laid, the resin agent 8 is poured from the opening 119 with the wires 12 each fixed at two places by the pedestal 102 and the second cover member 103 while a predetermined distance between the wires 12 is maintained. This enables work efficiency to be further improved while each of the wires 12 is stably maintained in shape. In addition, an O-ring 10 having a waterproof function is disposed in a peripheral portion of a second main surface 102b opposite to a first main surface 102a of the pedestal 102 in which the pool portion 104 is formed.

While the pedestal 102 and the second cover member 103 provided in the grommet 101 are not particularly limited in material and may be formed of any material, each of them is preferably formed of a hard material such as a plastic material. The plastic material includes polycarbonate (PC), polyethylene terephthalate (PET), polyethylene naphthalate (PEN), polyethylene ether ketone (PEEK), polybutylene terephthalate (PBT), polyamide (PA), liquid crystal polymer (LCP), and the like, for example.

When a hard material such as a plastic material is used for the pedestal 102 and the first cover member 103, rigidity can be applied to the pedestal 102 and the first cover member 103 to enable ingress of water caused by deformation due to external force to be further prevented. The second main surface 102b of the pedestal 102 is positioned on the outer side of (design surface side) of the housing of the battery pack or the like. Thus, when the pedestal 102 is formed of a hard material such as a plastic material, the pedestal 102 is excellent in design because there is no deformation by external force.

To further assure ease of assembling of the wires 12 into a housing of a battery pack 601 or the like and fixing force (holding force) against bending, twisting, and the like of each of the wires 12, it is preferable that the pedestal 102 and the second cover member 103 are each made of a hard material such as a plastic material.

It is preferable that the holes 105 of the pedestal 102 and the holes 106 of the second cover member 103 each have a minimum clearance for easily inserting the wires 12 into the corresponding holes. When the holes 105 and the holes 106 each have the minimum clearance, an effect of fixing the wires 12 and a waterproof effect are further achieved. As a result, the resin agent 8 does not overflow, so that each of the wires 12 does not need to be tightened with an elastic body such as rubber for waterproofing, thereby further facilitating the assembling work.

Figure 9A:
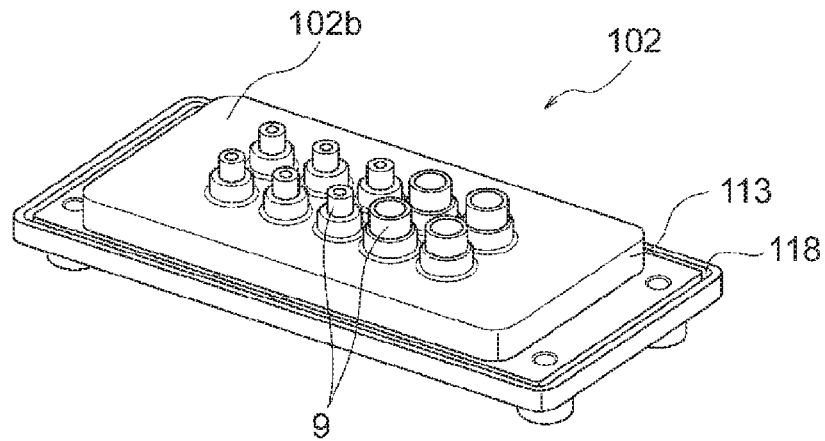
FIGS. 9A, 9B, and 9C are perspective views of a pedestal provided in the grommet according to the second embodiment of the present technology.
Figure 9B:
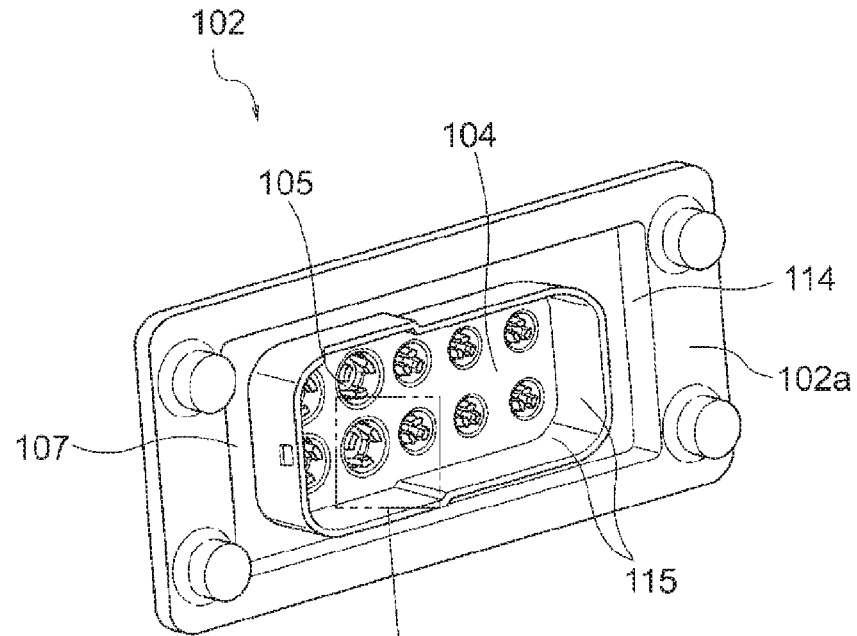
Figure 9C:
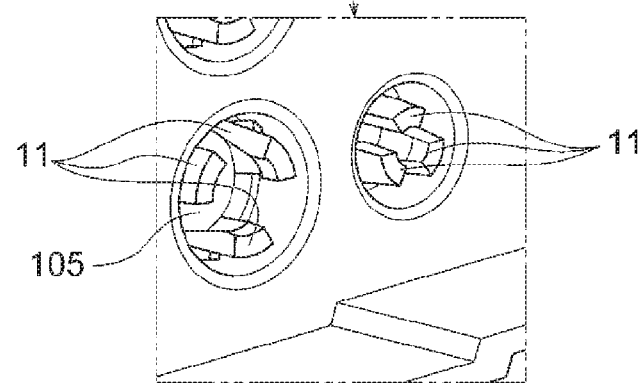

With reference to FIG. 9, the pedestal 102 provided in the grommet 101 will be described. FIG. 9(a) is a perspective view of the pedestal 102 on its second main surface 102b side. FIG. 9(b) is a perspective view of the pedestal 102 on its first main surface 102a side. FIG. 9(c) is an enlarged view of a part of the plurality of holes 105 of the pedestal 102.

As illustrated in FIGS. 9(a) and 9(b), the pedestal 102 has the first main surface 102a and the second main surface 102b, each of which has a substantially rectangular shape. The first main surface 102a and the second main surface 102b are positioned on respective opposite sides, and are in a front-back relationship. The second main surface 102b has a tabular protruding portion 113. The tabular protruding portion 113 is provided with a plurality of protrusions 9 thereon.

Details of the plurality of protrusions 9 are as described above. The second main surface 102b is also provided in its peripheral portion (a portion on the second main surface 102b, other than the tabular protruding portion 113) with a peripheral recessed portion 118 for disposing the O-ring 10 being a waterproof member therein.

The first main surface 102a has a tabular recessed portion 114. The tabular recessed portion 114 is provided with the pool portion 104 allowing the resin agent 8 to be poured thereinto, and the outer trench 107. The pool portion 104 has a substantially rectangular shape, and includes side surface plates 115 for partitioning the pool portion 104, provided in a direction perpendicular to the first main surface 102a. The outer trench 107 is formed outside the side surface plates 115, and on an outer peripheral side of the pool portion 104. The pool portion 104 is provided in its longitudinal direction for each row with five holes 105 for inserting the respective wires 12, and in its lateral direction for each row with two holes 105 for inserting the respective wires 12. That is, the pool portion 104 is provided with the ten holes 105. The number of the holes 105 illustrated in FIG. 9(b), which is ten, is only an example, and the number of the holes 105 is optionally changed according to the number of wires.

As illustrated in FIG. 9(c), a resin spring 11 is provided around the each of the holes 105 as a holding member for holding the wire 12. Details of the resin spring 11 are as described above.

Figure 10A:
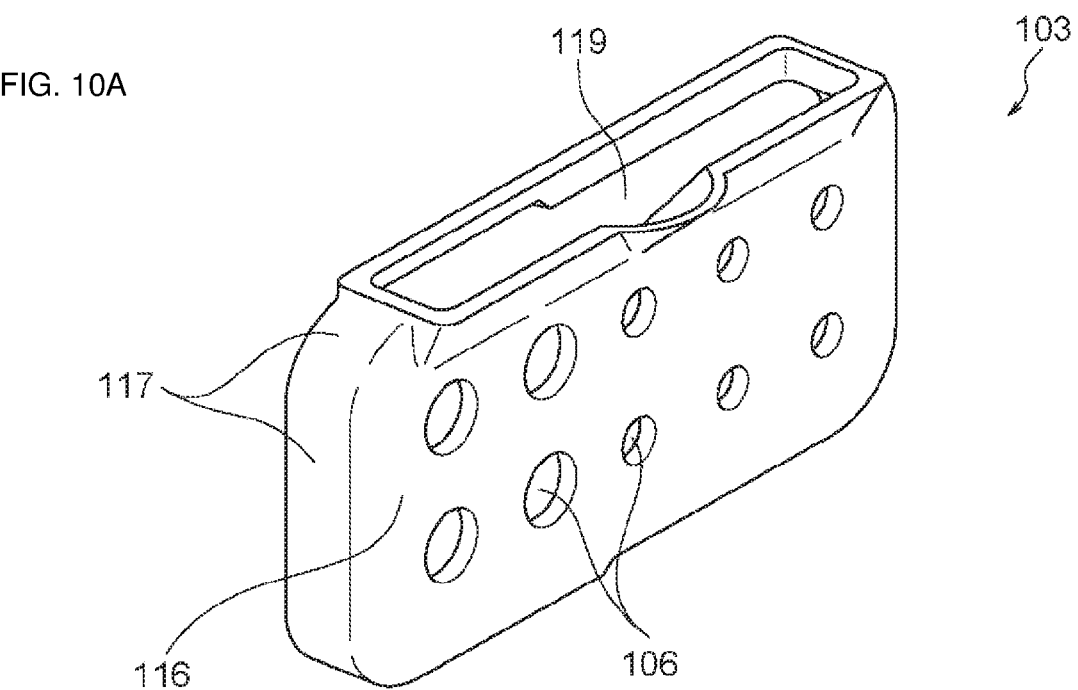
FIGS. 10A and 10B are perspective views of a second cover member (wire fixing member) provided in the grommet according to the second embodiment of the present technology.
Figure 10B:
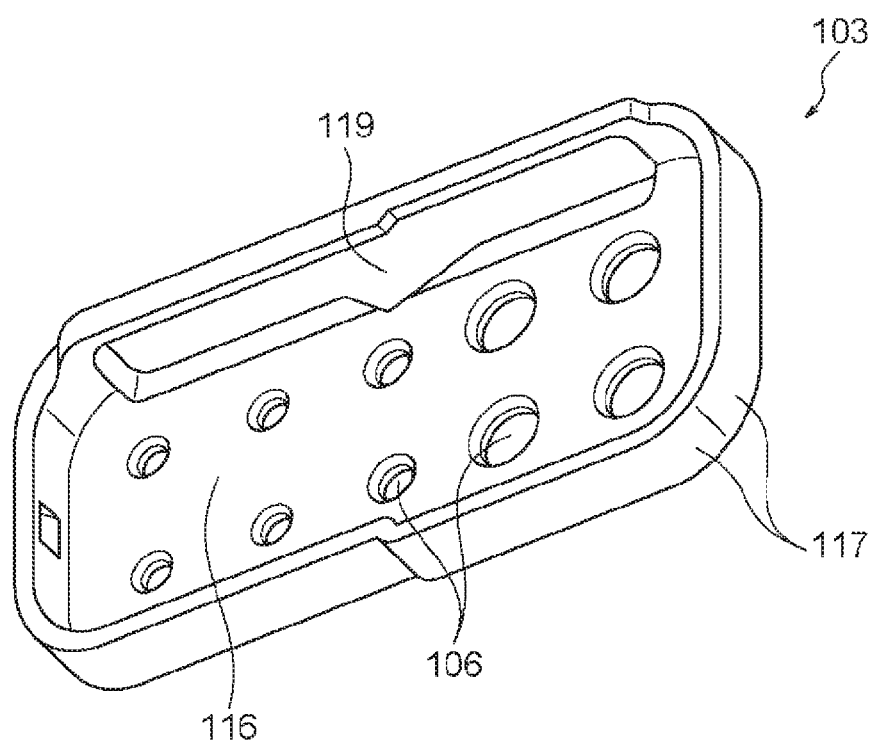

With reference to FIG. 10, the second cover member 103 provided in the grommet 101 will be described. FIG. 10(a) is a perspective view of the second cover member 103 on its front surface side. FIG. 10(b) is a perspective view of the second cover member 103 on its back surface side.

As illustrated in FIGS. 10(a) and 10(b), the second cover member 103 includes a flat plate (bottom plate) 116 for covering the pool portion 104, and side surface plates 117 provided in a direction perpendicular to the flat plate (bottom plate) 116. The second cover member 103 further includes an opening 119 through which the resin agent 8 is poured. The side surface plates 117 enable the second cover member 103 to be fixed to the pedestal 102. The flat plate (bottom plate) 116 is provided in its longitudinal direction for each row with five holes 106 for inserting the respective wires 12, and in its lateral direction for each row with two holes 106 for inserting the respective wires 12. That is, the second cover member 103 is provided with the ten holes 106. The number of the holes 106 illustrated in FIGS. 10(a) and 10(b), which is ten, is only an example, and the number of the holes 106 is optionally changed according to the number of wires.

The ten holes 105 are disposed in the pool portion 104 to substantially align with the corresponding ten holes 106 disposed in the flat plate (bottom plate) 116 such that each of ten wires 12 does not twist or bend when the ten wires 12 are inserted into the respective holes 105 of the pedestal 102, and subsequently inserted into the respective holes 106 of the second cover member 103.

With reference to FIGS. 13 to 17, a grommet 201 according to a third embodiment (modified example 2 of the grommet) of the present technology will be described.

The grommet 201 includes an integrally molded body 220 in which molding a pedestal 202 and a third cover member 203 are integrally molded formed being a wire fixing member for fixing wires 12. The pedestal 202 has a plurality of holes 206 through which the respective wires 12 are inserted. The third cover member 203 has a plurality of holes 206 through which the respective wires 12 are inserted. The pedestal 202 includes a pool portion 204 into which a resin agent 8 is poured and cured.

Figure 13:
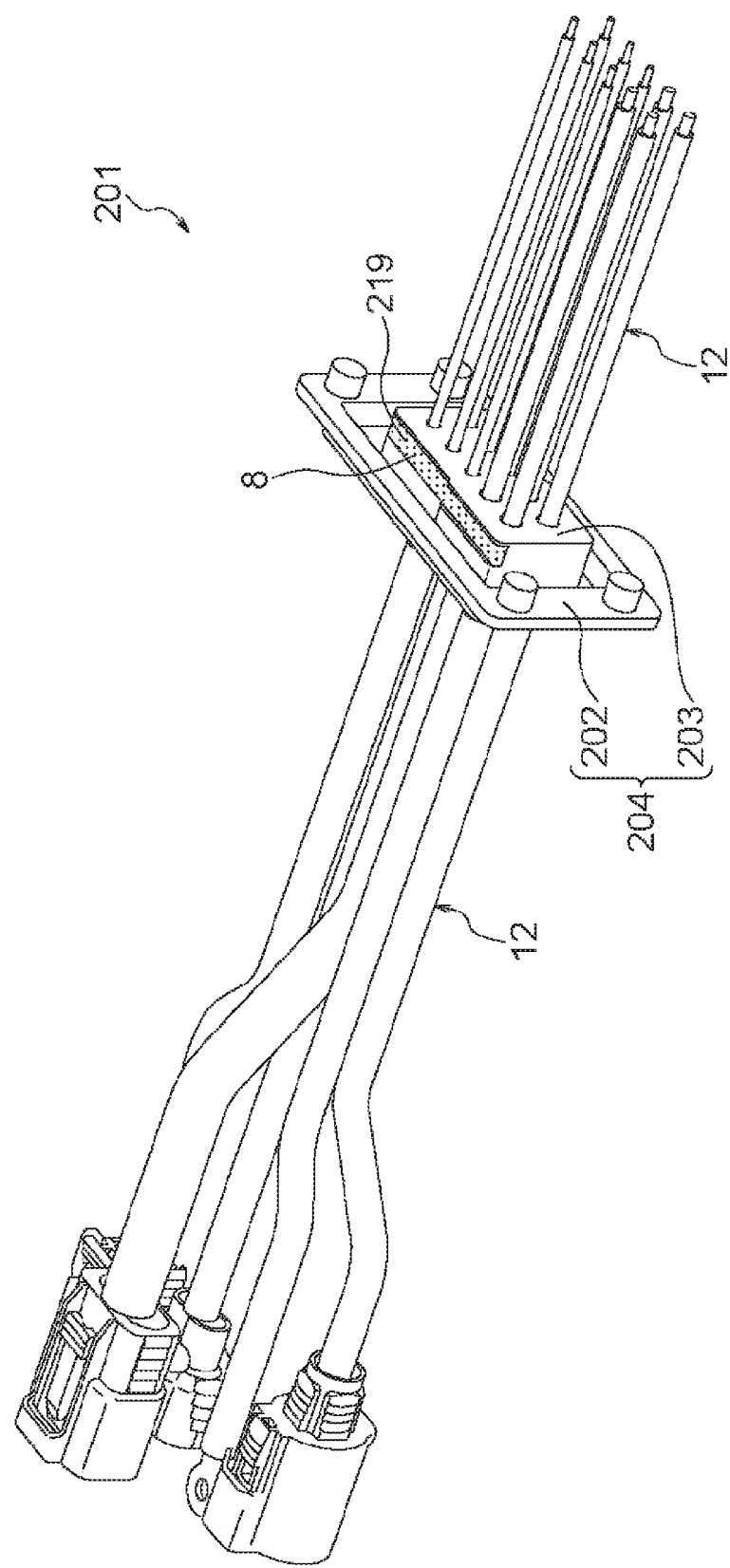
FIG. 13 is a perspective view of a grommet according to a third embodiment of the present technology.
Figure 14A:
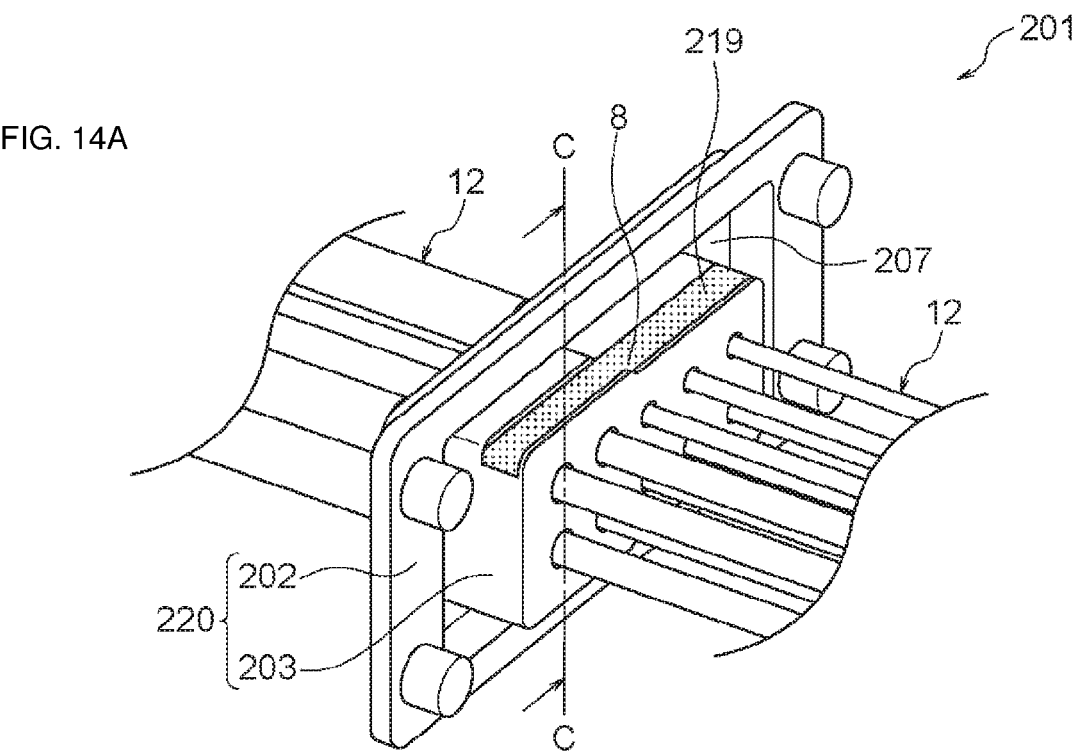
FIGS. 14A and 14B are enlarged perspective views of the grommet according to the third embodiment of the present technology.
Figure 14B:
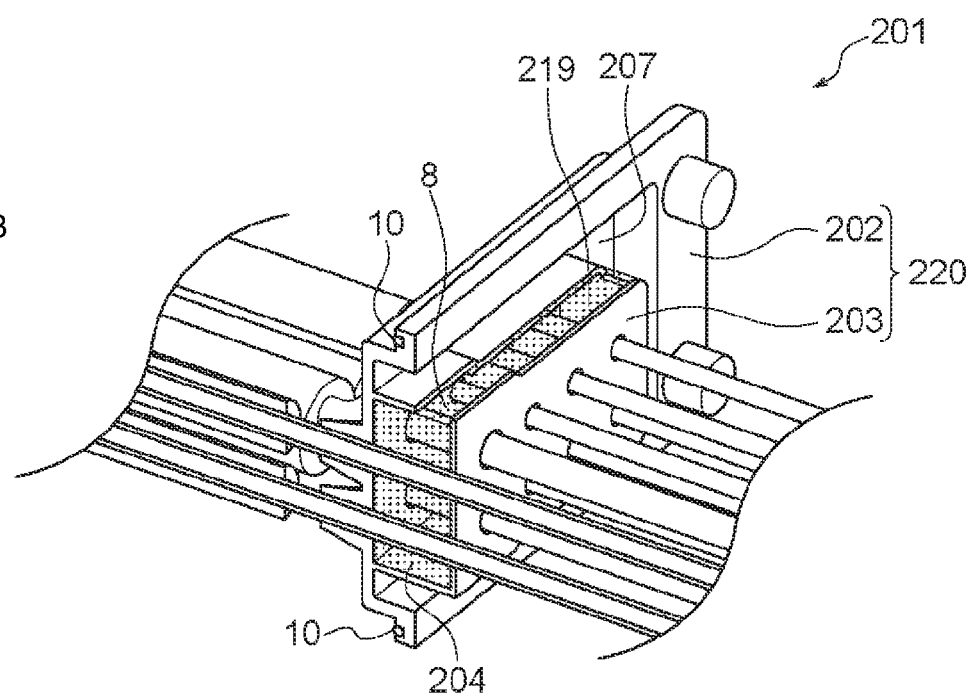

FIG. 13 is a perspective view of the grommet 201 through which the wires 12 are inserted, and FIG. 14(a) is an enlarged perspective view of the grommet 201 through which the wires 12 are inserted. FIG. 14(b) is a sectional perspective view taken along line C-C illustrated in FIG. 14(a).

As illustrated in FIGS. 13 and 14, the grommet 201 fixes the wires 12 with the integrally molded body 220 formed by integrally molding a pool portion 204 and the third cover member 203 until the resin agent 8 is cured. This enables preventing uneven thickness of the resin agent 8 caused when the wires 12 are close to each other or brought into contact with each other, so that the grommet 201 has structure capable of achieving waterproof between the wires 12 to enable its waterproof performance to be stable.

The grommet 201 includes the pedestal 202 in which the pool portion 204 is provided with an outer trench 207 to receive the resin agent 8 poured from an opening 219, overflowing to an outer periphery of the pedestal 202, such that no problem is caused in view of manufacturing feasibility and appearance (design property). As a result, the wires 12 inserted into the respective holes 205 can be sealed with the resin agent 8 in the pool portion 204 to prevent ingress of water. This enables labor saving in work requiring force, such as pressing a wire into a rubber grommet, for example, so that work efficiency can be improved.

Figure 16:
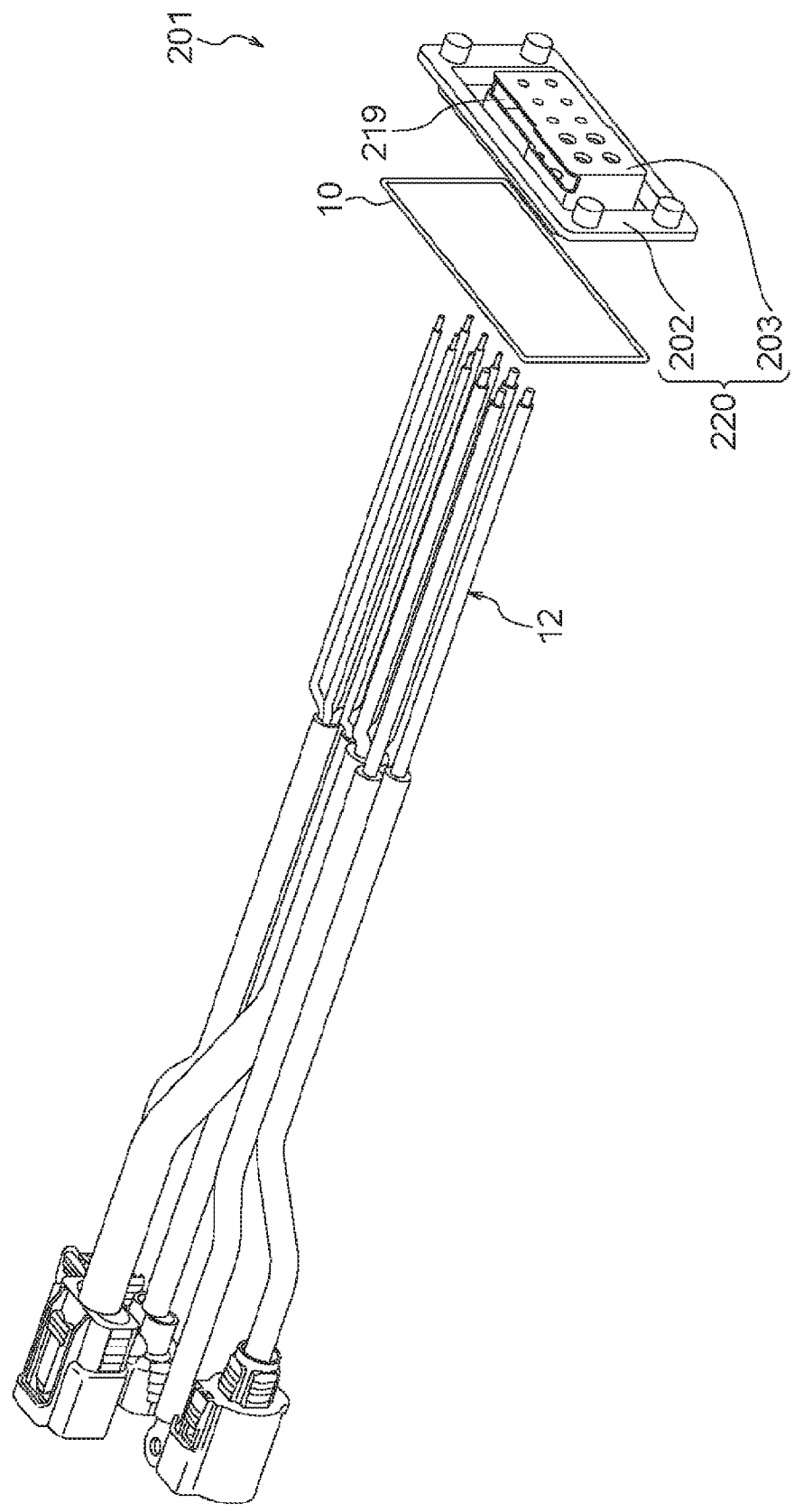
FIG. 16 is an exploded perspective view of the grommet according to the third embodiment of the present technology.
Figure 17:
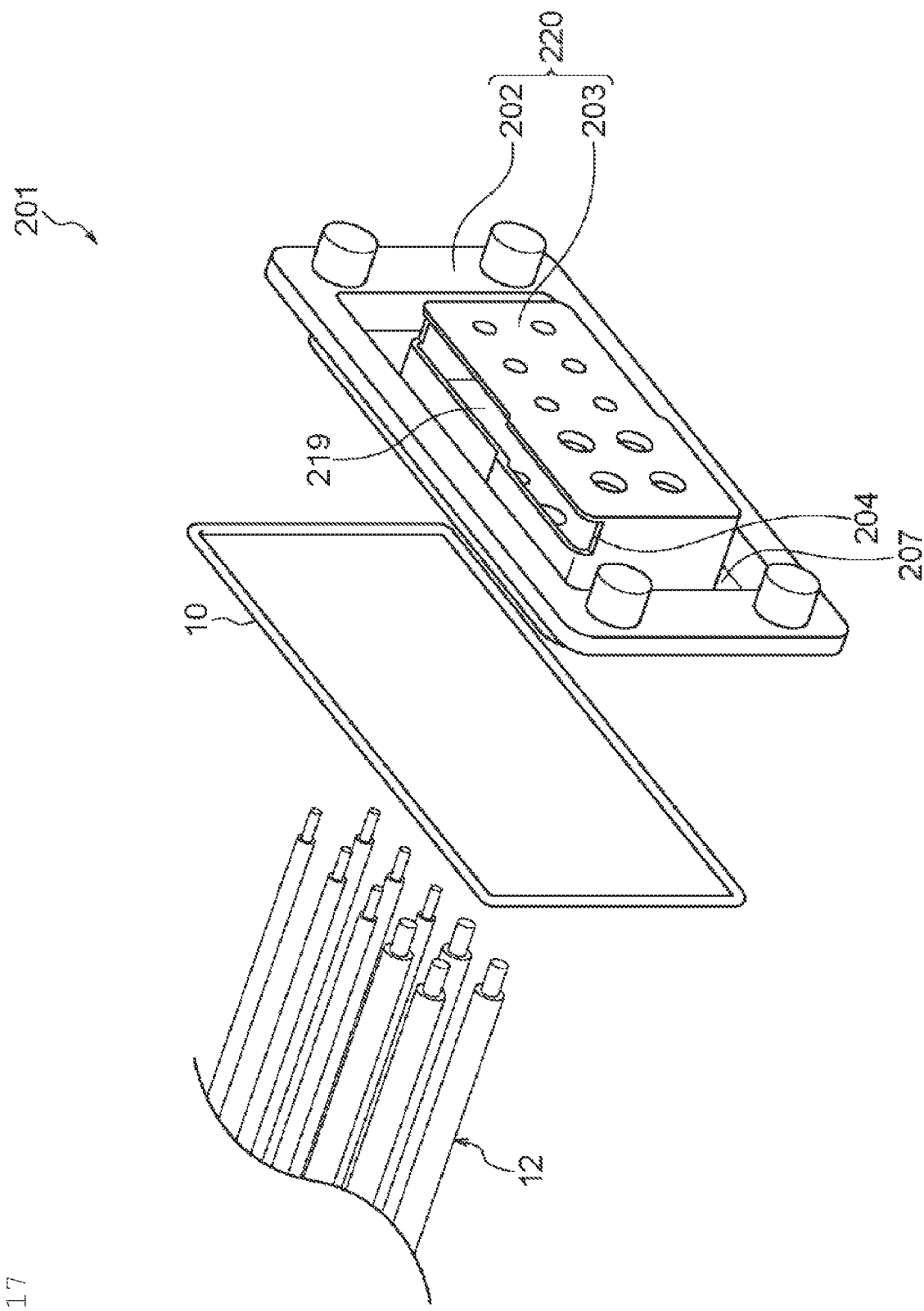
FIG. 17 is an exploded and enlarged perspective view of the grommet according to the third embodiment of the present technology.

FIG. 16 is an exploded perspective view of the grommet 201 before the wires 12 are inserted thereinto, and FIG. 17 is an exploded and enlarged perspective view of the grommet 201 before the wires 12 are inserted thereinto.

As illustrated in FIGS. 16 to 17, the pool portion 204 and the third cover member 203 are integrally molded to form the integrally molded body 220. Subsequently, while the wires 12 are laid, the wires 12 are inserted into the respective holes 205 of the pedestal 202, each having a minimum clearance. Subsequently, the wires 12 are inserted into the respective holes 206 of the third cover member 203, each having a minimum clearance, to fix each of the wires 12 at two places with the integrally molded body 220 while a predetermined distance between the wires 12 is maintained. Then, the resin agent 8 is poured from the opening 219 of the integrally molded body 220. As a result, the grommet 201 enables each of the wires 12 to be stably maintained in shape by preventing the wires 12 from being close to each other or being brought into contact with each other until the resin agent 8 is cured. While the wires 12 are laid, the resin agent 8 is poured from the opening 219 by fixing each of the wires 12 with the integrally molded body 220. This enables work efficiency to be further improved while each of the wires 12 is stably maintained in shape. In addition, an O-ring 10 having a waterproof function is disposed in a peripheral portion of a second main surface 220b opposite to a first main surface 220a of the integrally molded body 220.

While the integrally molded body 220 provided in the grommet 201 are not particularly limited in material and may be formed of any material, it is preferably formed of a hard material such as a plastic material. The plastic material includes polycarbonate (PC), polyethylene terephthalate (PET), polyethylene naphthalate (PEN), polyethylene ether ketone (PEEK), polybutylene terephthalate (PBT), polyamide (PA), liquid crystal polymer (LCP), and the like, for example.

When a hard material such as a plastic material is used for the integrally molded body 220, rigidity can be applied to the integrally molded body 220 to enable ingress of water caused by deformation due to external force to be further prevented. The second main surface 220b of the integrally molded body 220 is positioned on the outer side of (design surface side) of a housing of a battery pack or the like. Thus, when the integrally molded body 220 is formed of a hard material such as a plastic material, the integrally molded body 220 is excellent in design because there is no deformation by external force.

To further assure ease of assembling of the wires 12 into a housing of a battery pack 601 or the like and wire fixing force (holding force) against bending, twisting, and the like of each of the wires 12, it is preferable that the integrally molded body 220 is made of a hard material such as a plastic material.

It is preferable that the holes 205 of the integrally molded body 220 (pedestal 202) and the holes 206 of the integrally molded body 220 (third cover member 203) each have a minimum clearance for easily inserting the wires 12 into the corresponding holes. When the holes 205 and the holes 206 each have the minimum clearance, an effect of fixing the wires 12 and a waterproof effect are further achieved. As a result, the resin agent 8 does not overflow, so that each of the wires 12 does not need to be tightened with an elastic body such as rubber for waterproofing, thereby further facilitating the assembling work.

Figure 15A:
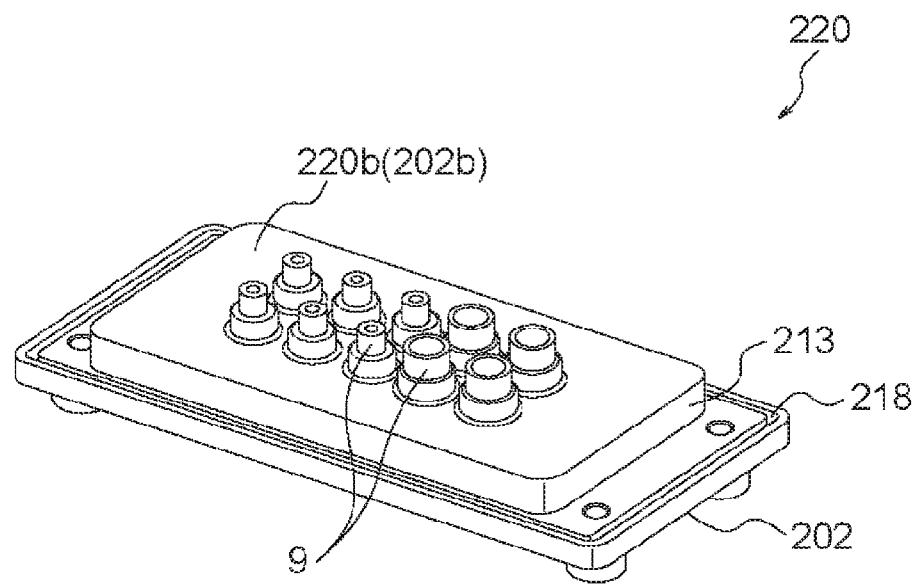
FIGS. 15A and 15B are perspective views of an integrally molded body provided in the grommet according to the third embodiment of the present technology.
Figure 15B:
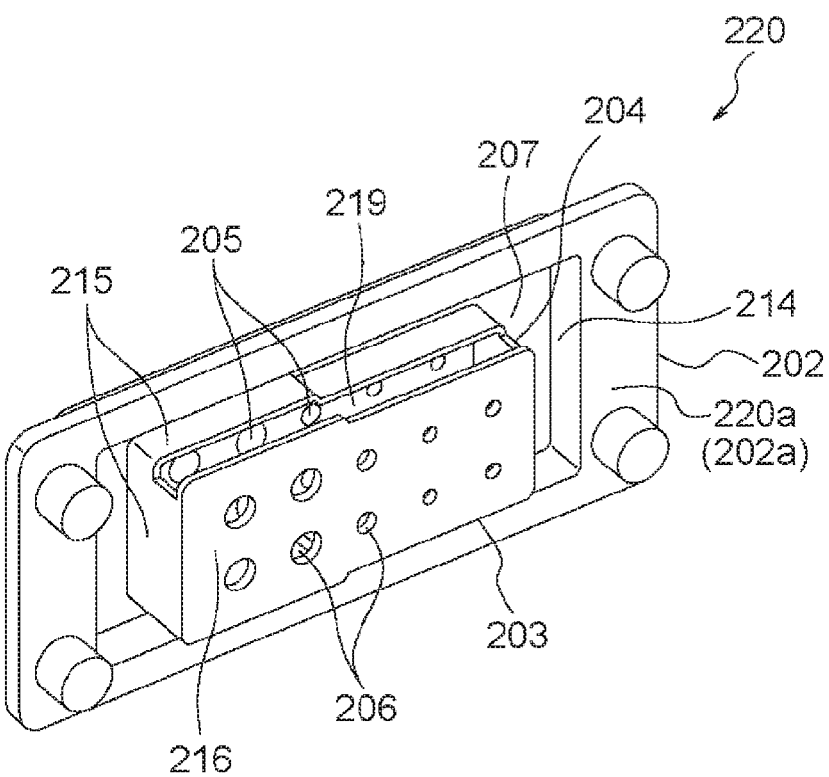

With reference to FIG. 15, an integrated molded body 220 in which the pedestal 202 and the third cover member 203 are integrally molded, which is provided in the grommet 201, will be described. FIG. 15(a) is a perspective view of the integrally molded body 220 on its second main surface 220b side (also the pedestal 202 on its second main surface 202b side). FIG. 15(b) is a perspective view of the integrally molded body 220 on its first main surface 220a side (also the pedestal 202 on its first main surface 202a side).

As illustrated in FIGS. 15(a) and 15(b), the integrally molded body 220 has the first main surface 220a and the second main surface 220b, each of which has a substantially rectangular shape. The first main surface 220a and the second main surface 220b are positioned on respective opposite sides, and are in a front-back relationship. It may be interpreted that the pedestal 202 has the first main surface 202a and the second main surface 202b, each having a substantially rectangular shape. The integral molded body 220 further has an opening 219 through which the resin agent 8 is poured. The second main surface 220b has a tabular protruding portion 213. The tabular protruding portion 213 is provided with a plurality of protrusions 9 thereon. Details of the plurality of protrusions 9 are as described above. The second main surface 220b is also provided in its peripheral portion (a portion on the second main surface 220b, other than the tabular protruding portion 213) with a peripheral recessed portion 218 for disposing the O-ring 10 being a waterproof member therein.

The first main surface 220a has a tabular recessed portion 214. The tabular recessed portion 214 is provided with the pool portion 204 allowing the resin agent 8 to be poured from the opening 219 thereinto, the third cover member 203 for covering the pool portion 204, and the outer trench 207. The pool portion 204 has a substantially rectangular shape, and includes side surface plates 215 for partitioning the pool portion 204, provided in a direction perpendicular to the first main surface 220a. The outer trench 207 is formed outside the side surface plates 215, or on an outer peripheral side of the pool portion 204. The third cover member 203 may have side surface plates as with the first cover member 3 and the second cover member 103 described above, and the side surface plates may be integrally molded with the side surface plates 215 of the pool portion 204.

The third cover member 203 is provided in its longitudinal direction for each row with five holes 206 for inserting the respective wires 12, and in its lateral direction for each row with two holes 206 for inserting the respective wires. That is, the third cover member 203 is provided with the ten holes 206. The pool portion 204 is provided in its longitudinal direction for each row with five holes 205 for inserting the respective wires 12, and in its lateral direction for each row with two holes 205 for inserting the respective wires 12. That is, the pool portion 204 is provided with the ten holes 205. The ten holes 205 are disposed in the pool portion 204 to substantially align with the corresponding ten holes 206 disposed in the third cover member 203 such that each of ten wires 12 does not twist or bend when the ten wires 12 are inserted into the integrally molded body 220. The number of each of the holes 205 and 206 illustrated in FIG. 15(b), which is ten, is only an example, and the number of each of the holes 205 and 206 is optionally changed according to the number of wires.

Around the each of the holes 205, a resin spring 11 may be provided as a holding member for holding the wire 12. In addition, around the each of the holes 206, the resin spring 11 may be provided as the holding member for holding the wire 12. Details of the resin spring 11 are as described above.

With reference to FIGS. 18 to 23, a grommet 301 according to a fourth embodiment (modified example 3 of the grommet) of the present technology will be described.

The grommet 301 includes a pedestal 302 and a plurality of supporting structures 303 each configured as a wire fixing member for fixing the corresponding one of wires 12. The pedestal 302 has a plurality of holes 305 through which the respective wires 12 are inserted. The plurality of supporting structures 303 each has a hole 306 through which the corresponding one of the wires 12 is inserted. The pedestal 302 includes a pool portion 304 into which a resin agent 8 is poured and cured.

Figure 18:
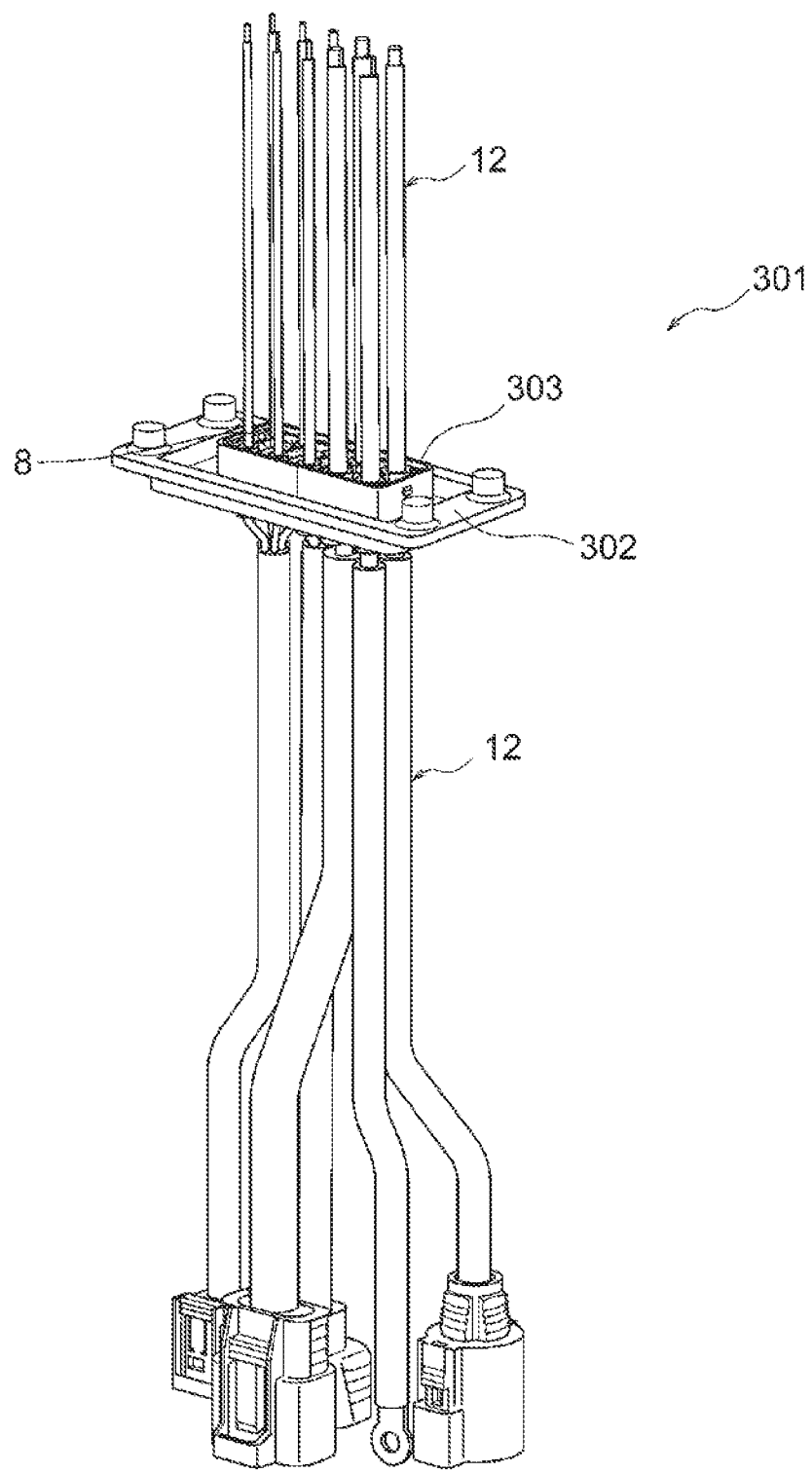
FIG. 18 is a perspective view of a grommet according to a fourth embodiment of the present technology.
Figure 19A:
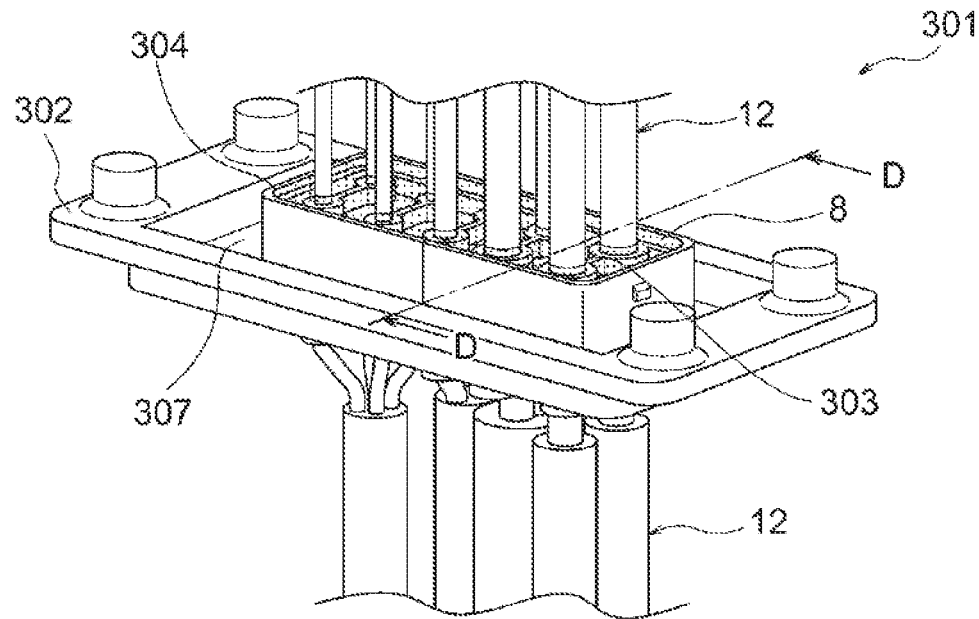
FIGS. 19A and 19B are enlarged perspective views of the grommet according to the fourth embodiment of the present technology.
Figure 19B:
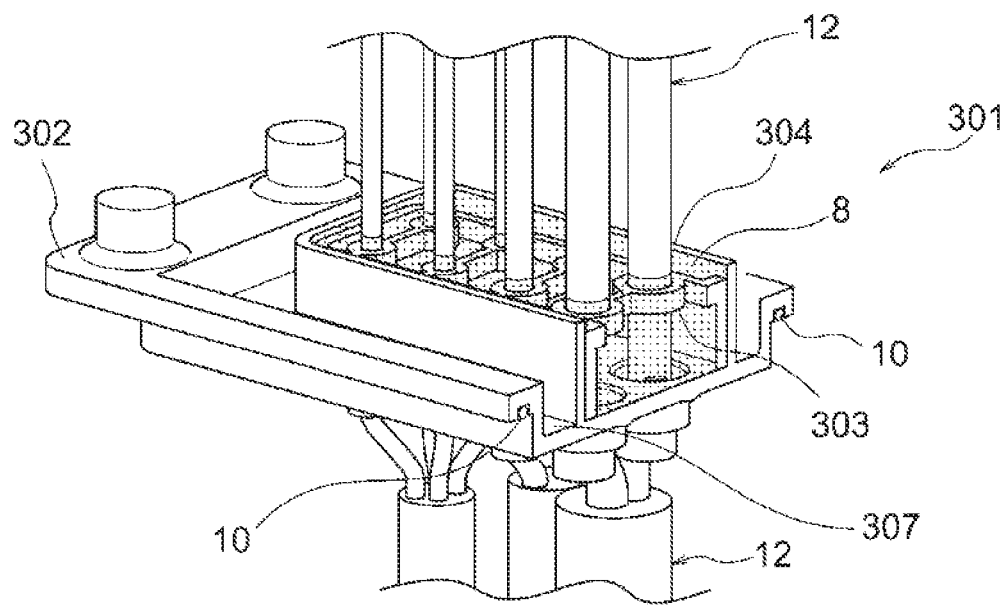

FIG. 18 is a perspective view of the grommet 301 through which the wires 12 are inserted, and FIG. 19(a) is an enlarged perspective view of the grommet 301 through which the wires 12 are inserted. FIG. 19(b) is a sectional perspective view taken along line D-D illustrated in FIG. 19(a).

As illustrated in FIGS. 18 and 19, the grommet 301 fixes the wires 12 with the pedestal 302 and the supporting structures 303 by providing the supporting structures 303 inside the pool portion 304 until the resin agent 8 is cured. This enables preventing uneven thickness of the resin agent 8 caused when the wires 12 are close to each other or brought into contact with each other, so that the grommet 1 has structure capable of achieving waterproof between the wires 12 to enable its waterproof performance to be stable.

The grommet 301 includes the pedestal 302 in which the pool portion 304 is provided with an outer trench 307 to receive the resin agent 8 overflowing to an outer periphery of the pedestal 2 such that no problem is caused in view of manufacturing feasibility and appearance (design property). As a result, the wires 12 inserted into the respective holes 305 can be sealed with the resin agent 8 in the pool portion 304 to prevent ingress of water. This enables labor saving in work requiring force, such as pressing a wire into a rubber grommet, for example, so that work efficiency can be improved.

Figure 22:
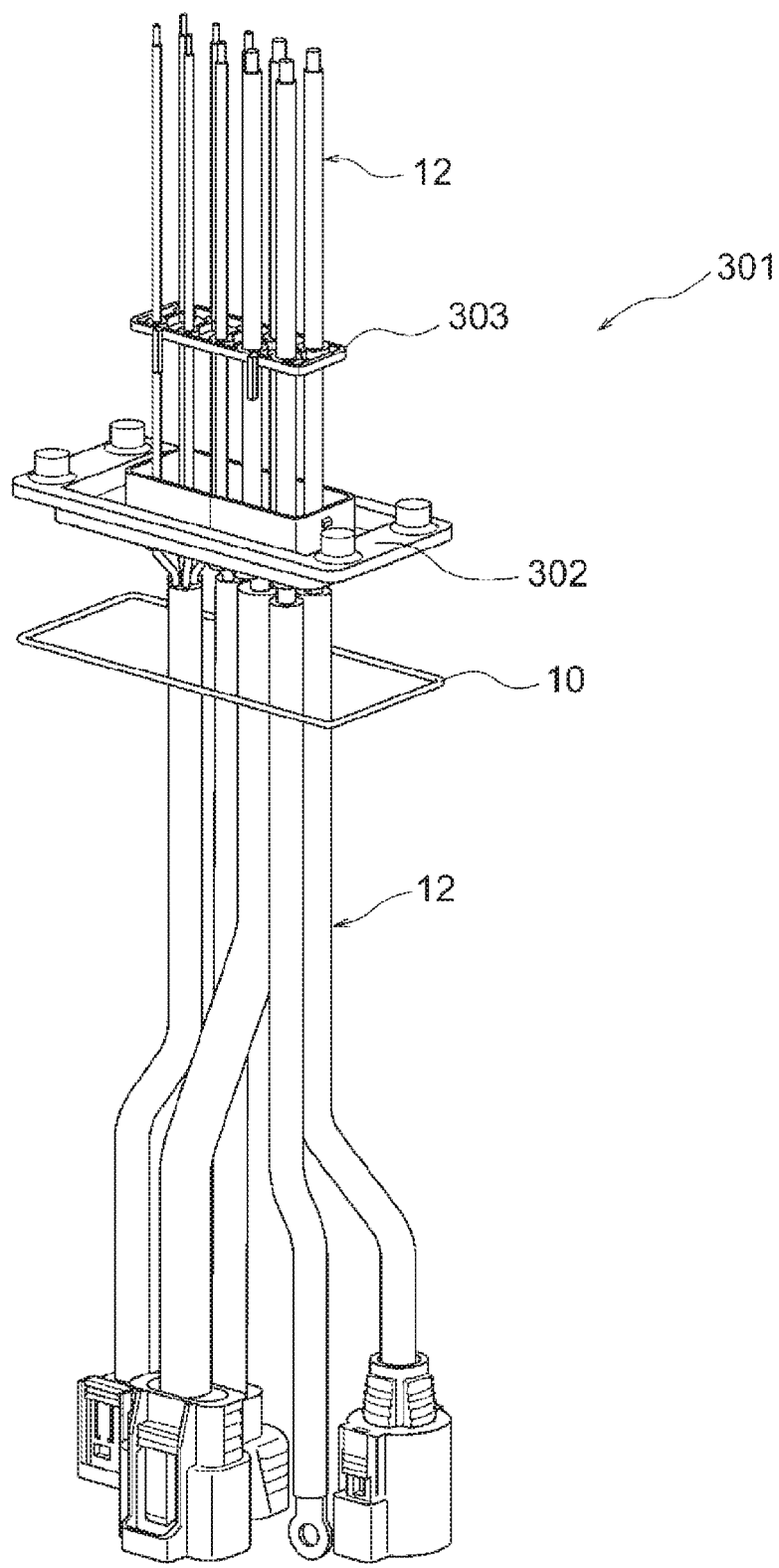
FIG. 22 is an exploded perspective view of the grommet according to the fourth embodiment of the present technology.
Figure 23:
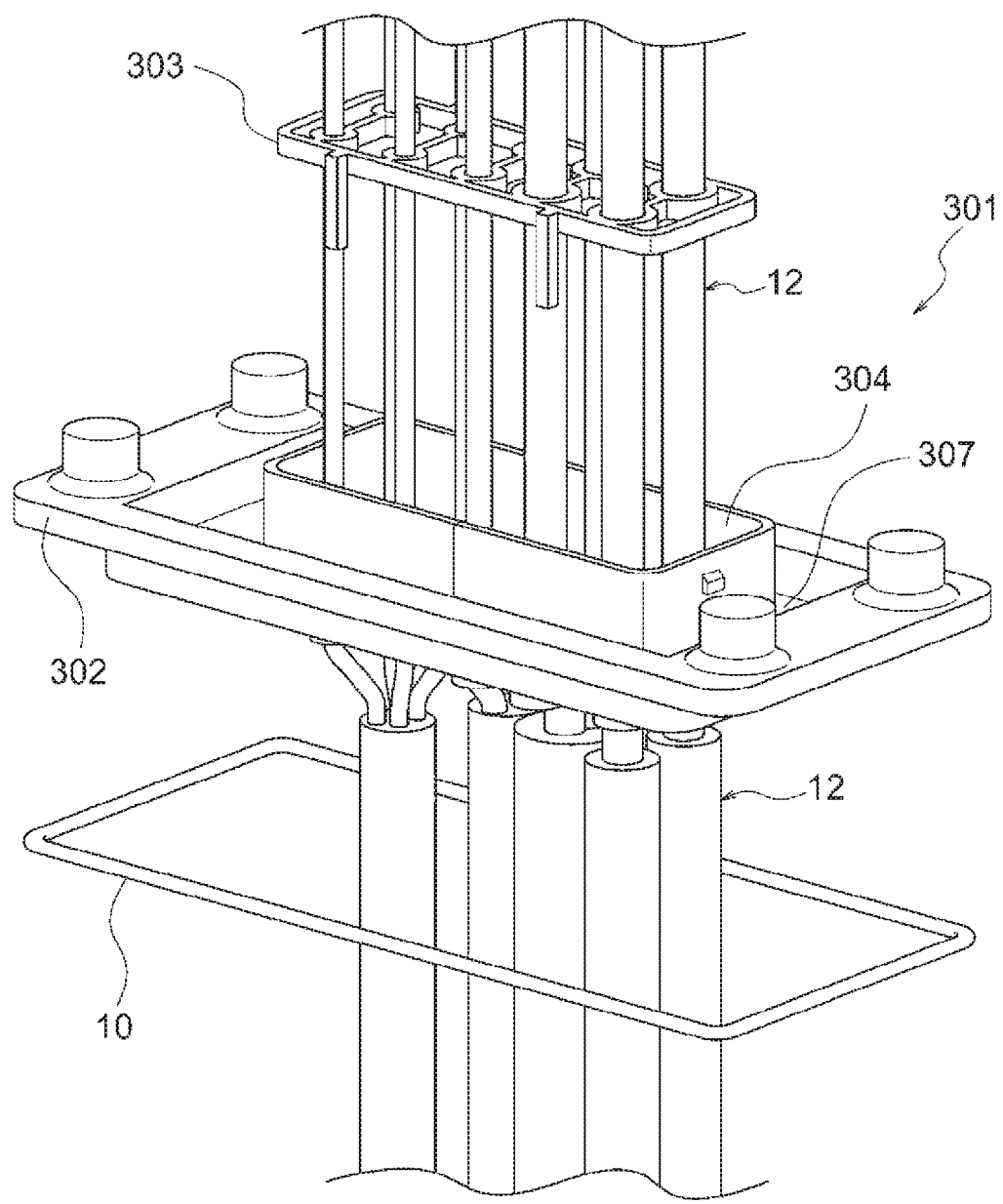
FIG. 23 is an exploded and enlarged perspective view of the grommet according to the fourth embodiment of the present technology.

FIG. 22 is an exploded perspective view of the grommet 302 through which the wires 12 are inserted, and FIG. 23 is an exploded and enlarged perspective view of the grommet 302 through which the wires 12 are inserted.

As illustrated in FIGS. 22 and 23, while the wires 12 are erected, the wires 12 are inserted into the respective holes 305 of the pedestal 302, each having a minimum clearance. Subsequently, the wires 12 are inserted into the respective holes 306 of the corresponding supporting structures, each having a minimum clearance, to fix each of the wires 12 at two places with the pedestal 302 and the supporting structures 303 while a predetermined distance between the wires 12 is maintained. This prevents ingress of water through a clearance between each of the wires 12 and the corresponding one of the holes 305, or a clearance between each of the wires 12 and the corresponding one of the holes 306, and then the resin agent 8 is poured into the pool portion 304. As a result, the grommet 301 enables each of the wires 12 to be stably maintained in shape by preventing the wires 12 from being close to each other or being brought into contact with each other until the resin agent 8 is cured. In addition, an O-ring 10 having a waterproof function is disposed in a peripheral portion of a second main surface 302b opposite to a first main surface 302a of the pedestal 302 in which the pool portion 304 is formed.

While the pedestal 302 and the supporting structures 303 provided in the grommet 301 are not particularly limited in material and may be formed of any material, each of them is preferably formed of a hard material such as a plastic material. The plastic material includes polycarbonate (PC), polyethylene terephthalate (PET), polyethylene naphthalate (PEN), polyethylene ether ketone (PEEK), polybutylene terephthalate (PBT), polyamide (PA), liquid crystal polymer (LCP), and the like, for example.

When a hard material such as a plastic material is used for the pedestal 302 and the supporting structures 303, rigidity can be applied to the pedestal 302 and the supporting structures 303 to enable ingress of water caused by deformation due to external force to be further prevented. The second main surface 302b of the pedestal 302 is positioned on the outer side of (design surface side) of a housing of a battery pack or the like. Thus, when the pedestal 302 is formed of a hard material such as a plastic material, the pedestal 302 is excellent in design because there is no deformation by external force.

To further assure ease of assembling of the wires 12 into a housing of a battery pack 601 or the like and wire fixing force (holding force) against bending, twisting, and the like of each of the wires 12, it is preferable that the pedestal 302 and the supporting structures 303 are each made of a hard material such as a plastic material.

It is preferable that the holes 305 of the pedestal 302 and the holes 306 of the supporting structures 303 each have a minimum clearance so that the wires 12 can be easily inserted into the corresponding holes. When the holes 305 and the holes 306 each have the minimum clearance, an effect of fixing the wires 12 and a waterproof effect are further achieved. As a result, the resin agent 8 does not overflow, so that each of the wires 12 does not need to be tightened with an elastic body such as rubber for waterproofing, thereby further facilitating the assembling work.

Figure 20A:
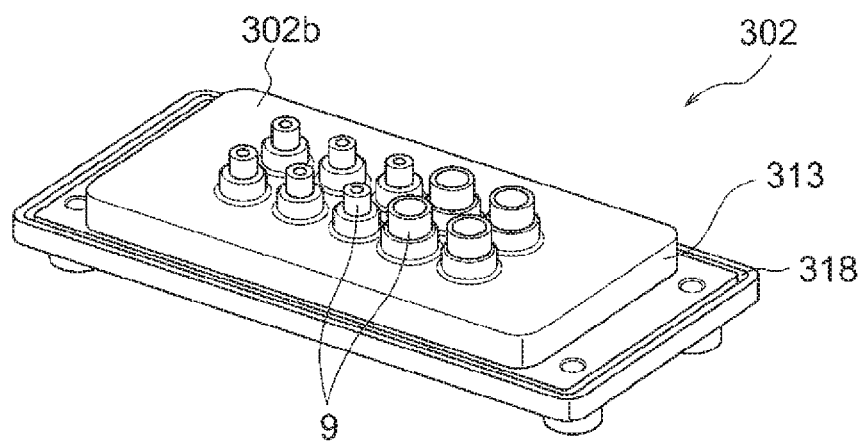
FIGS. 20A, 20B, and 20C are perspective views of a pedestal provided in the grommet according to the fourth embodiment of the present technology.
Figure 20B:
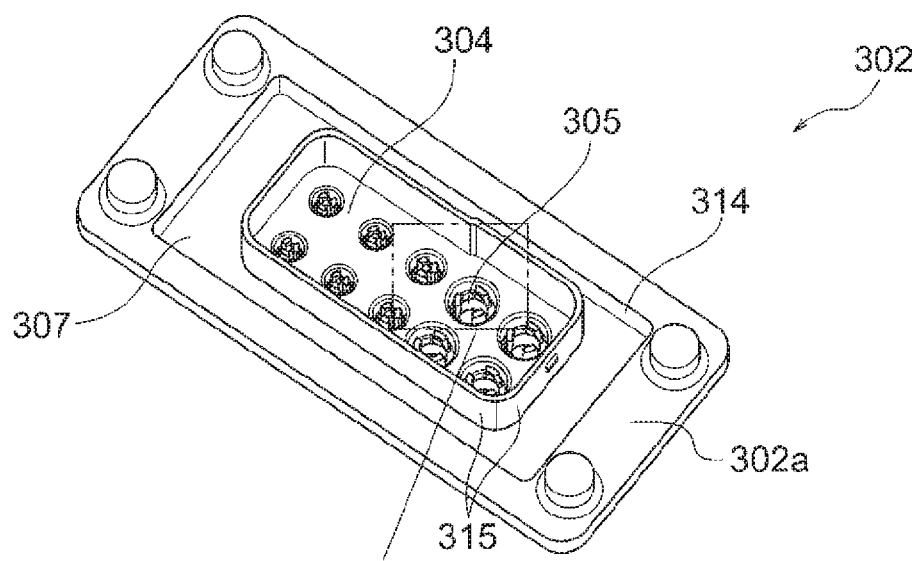
Figure 20C:
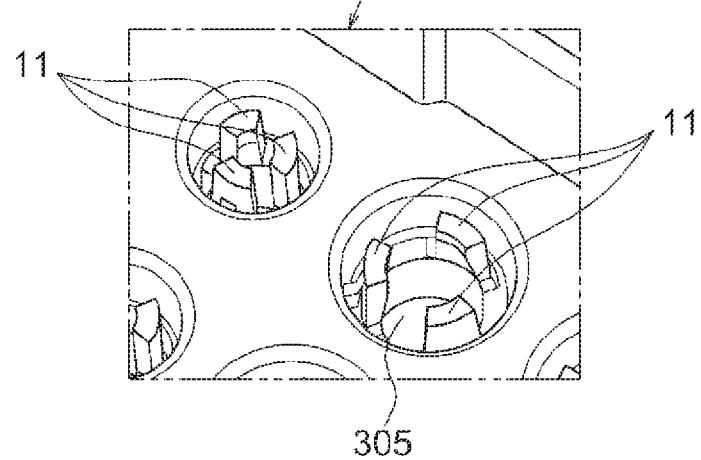

With reference to FIG. 20, the pedestal 302 provided in the grommet 301 will be described. FIG. 20(a) is a perspective view of the pedestal 302 on its second main surface 302b side. FIG. 20(b) is a perspective view of the pedestal 302 on its first main surface 302a side. FIG. 20(c) is an enlarged view of a part of the plurality of holes 305 of the pedestal 302.

As illustrated in FIGS. 20(a) and 20(b), the pedestal 302 has the first main surface 302a and the second main surface 302b, each of which has a substantially rectangular shape.

The first main surface 302a and the second main surface 302b are positioned on respective opposite sides, and are in a front-back relationship. The second main surface 302b has a tabular protruding portion 313. The tabular protruding portion 313 is provided with a plurality of protrusions 9 thereon. Details of the plurality of protrusions 9 are as described above. The second main surface 302b is also provided in its peripheral portion (a portion on the second main surface 302b, other than the tabular protruding portion 313) with a peripheral recessed portion 318 for disposing the O-ring 10 being a waterproof member therein.

The first main surface 302a has a tabular recessed portion 314. The tabular recessed portion 314 is provided with the pool portion 304 allowing the resin agent 8 to be poured thereinto, and the outer trench 307. The pool portion 304 has a substantially rectangular shape, and includes side surface plates 315 for partitioning the pool portion 304, provided in a direction perpendicular to the first main surface 302a. The outer trench 307 is formed outside the side surface plates 15, or on an outer peripheral side of the pool portion 304. The pool portion 304 is provided in its longitudinal direction for each row with five holes 305 for inserting the respective wires 12, and in its lateral direction for each row with two holes 305 for inserting the respective wires 12. That is, the pool portion 304 is provided with the ten holes 305. The number of the holes 305 illustrated in FIG. 20(b), which is ten, is only an example, and the number of the holes 305 is optionally changed according to the number of wires.

Figure 21A:
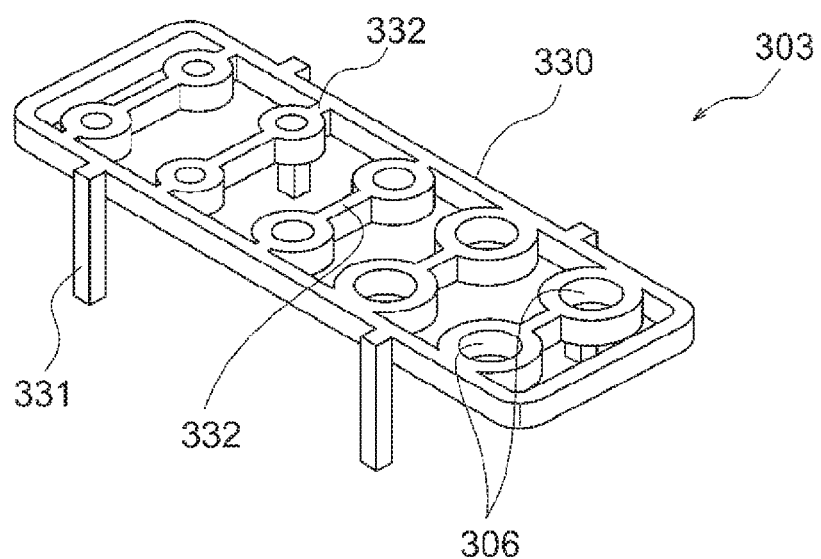
FIGS. 21A and 21B are perspective views of a supporting structure provided in the grommet according to the fourth embodiment of the present technology.
Figure 21B:
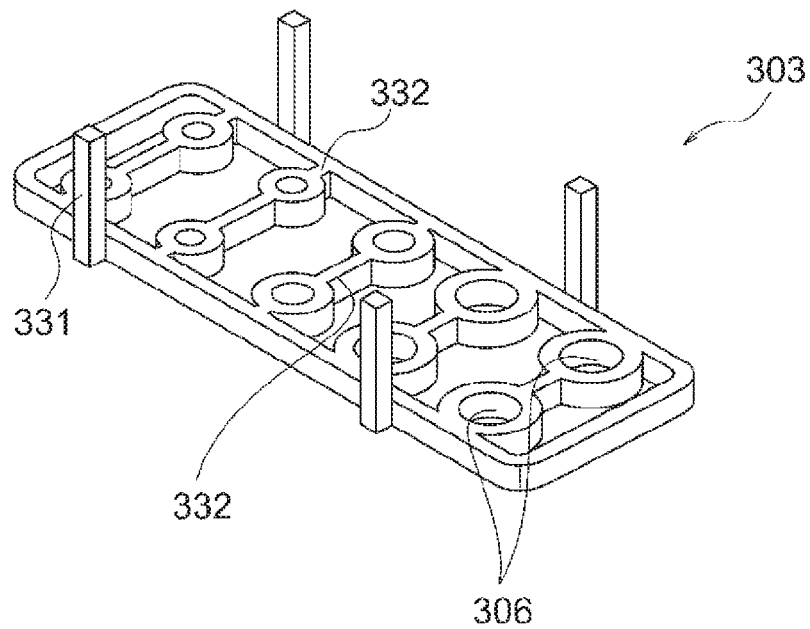

With reference to FIG. 21, the plurality of supporting structures 303 provided in the grommet 301 will be described. FIG. 21(a) is a perspective view of the plurality of supporting structures 303 on its front surface side. FIG. 21(b) is a perspective view of the plurality of supporting structures 303 on its back surface side.

As illustrated in FIGS. 21(a) and 21(b), five supporting structures 303 are formed in a longitudinal direction for each row and two supporting structures 303 are formed in a lateral direction for each row. The ten supporting structures in total form a substantially rectangular shape as a whole. The two supporting structures in the lateral direction for each row are connected by a connecting portion 332, and the five supporting structures in the longitudinal direction for each row are connected by a frame 330. The supporting structure 303 has the hole 306 for inserting the wire 12, and the ten supporting structures in total form a substantially rectangular shape as a whole, as described above. As a result, the five holes are disposed in the longitudinal direction for each row, and the two holes 306 are disposed in the lateral direction for each row. The frame 330 is provided with four supporting rods 331 so that ten rectangular supporting structures are inserted into the pool portion 304 provided in the pedestal 302 while maintaining a predetermined height. The number of the supporting structures illustrated in FIGS. 21(a) and 21(b), which is ten, is only an example, and the number of the supporting structures is optionally changed according to the number of wires.

The ten holes 305 are disposed in the pool portion 304 to substantially align with the corresponding ten holes 306 of the supporting structures 303 such that each of the wires 12 does not twist or bend when ten wires 12 are inserted into the respective holes 305 of the pedestal 302, and subsequently inserted into the corresponding ten holes 306 of the supporting structures 303.

Figure 24:
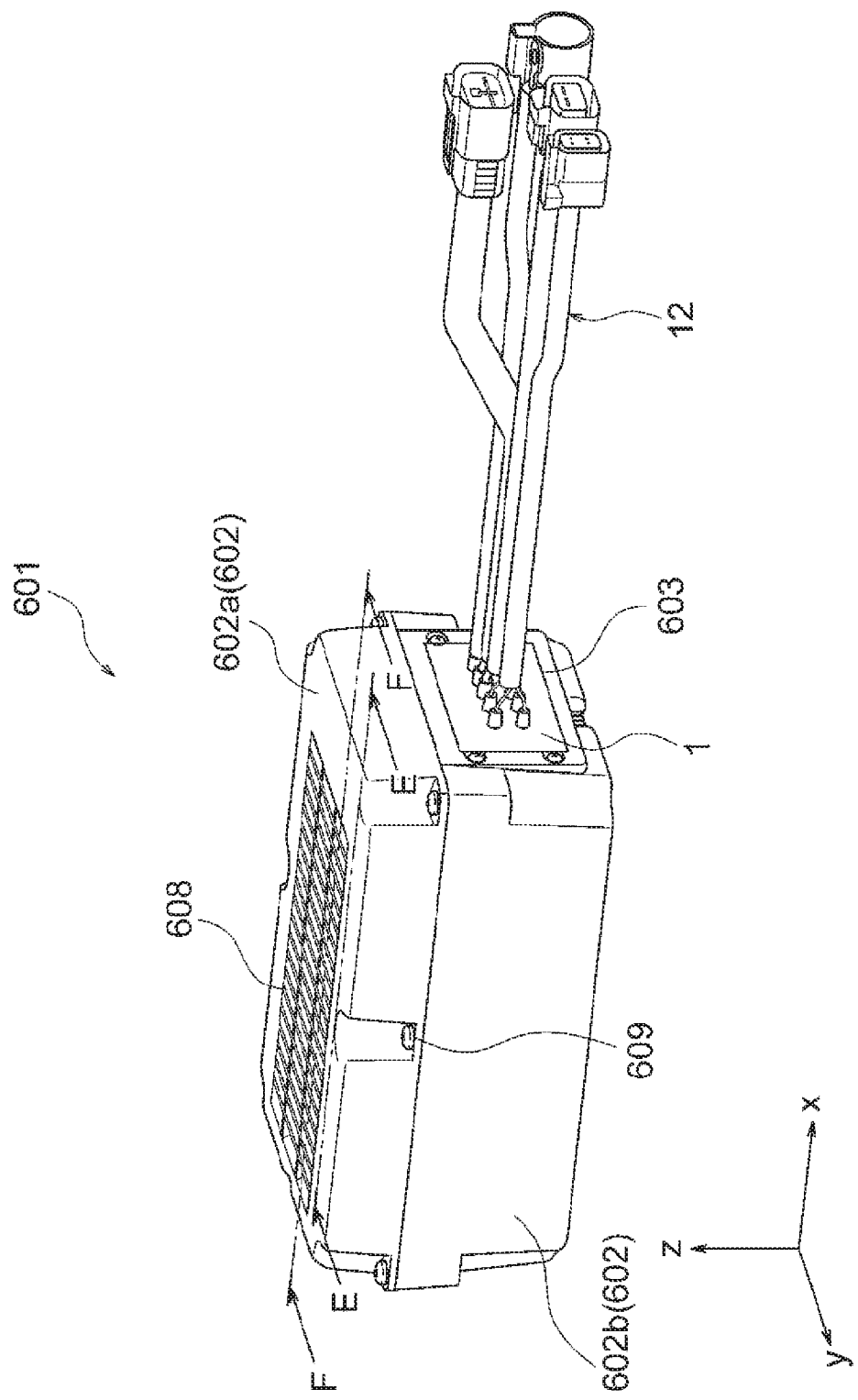
FIG. 24 is a perspective view of a battery pack according to a fifth embodiment of the present technology.
Figure 25:
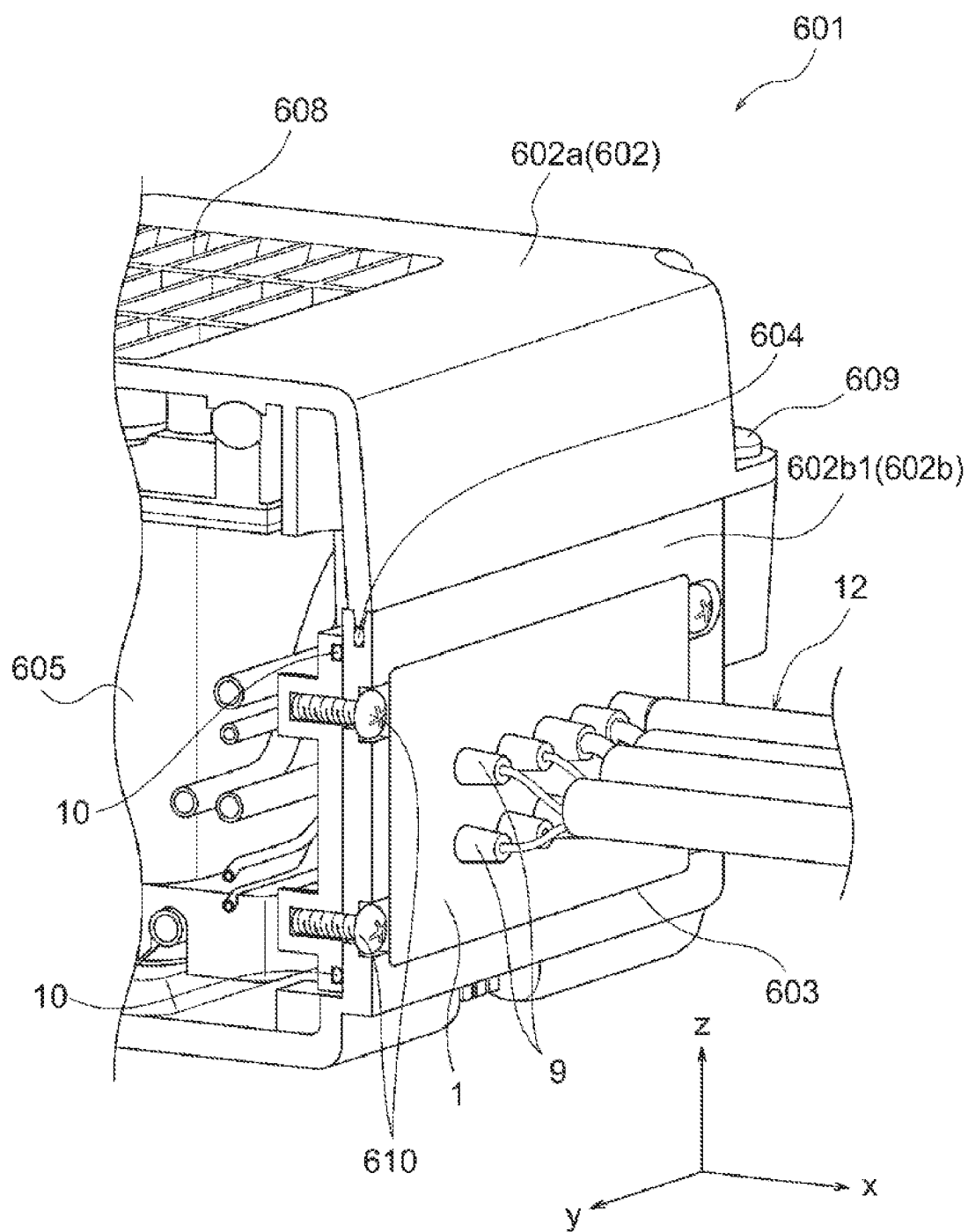
FIG. 25 is a sectional view of the battery pack according to the fifth embodiment of the present technology illustrated in FIG. 24, taken along line EE.
Figure 26:
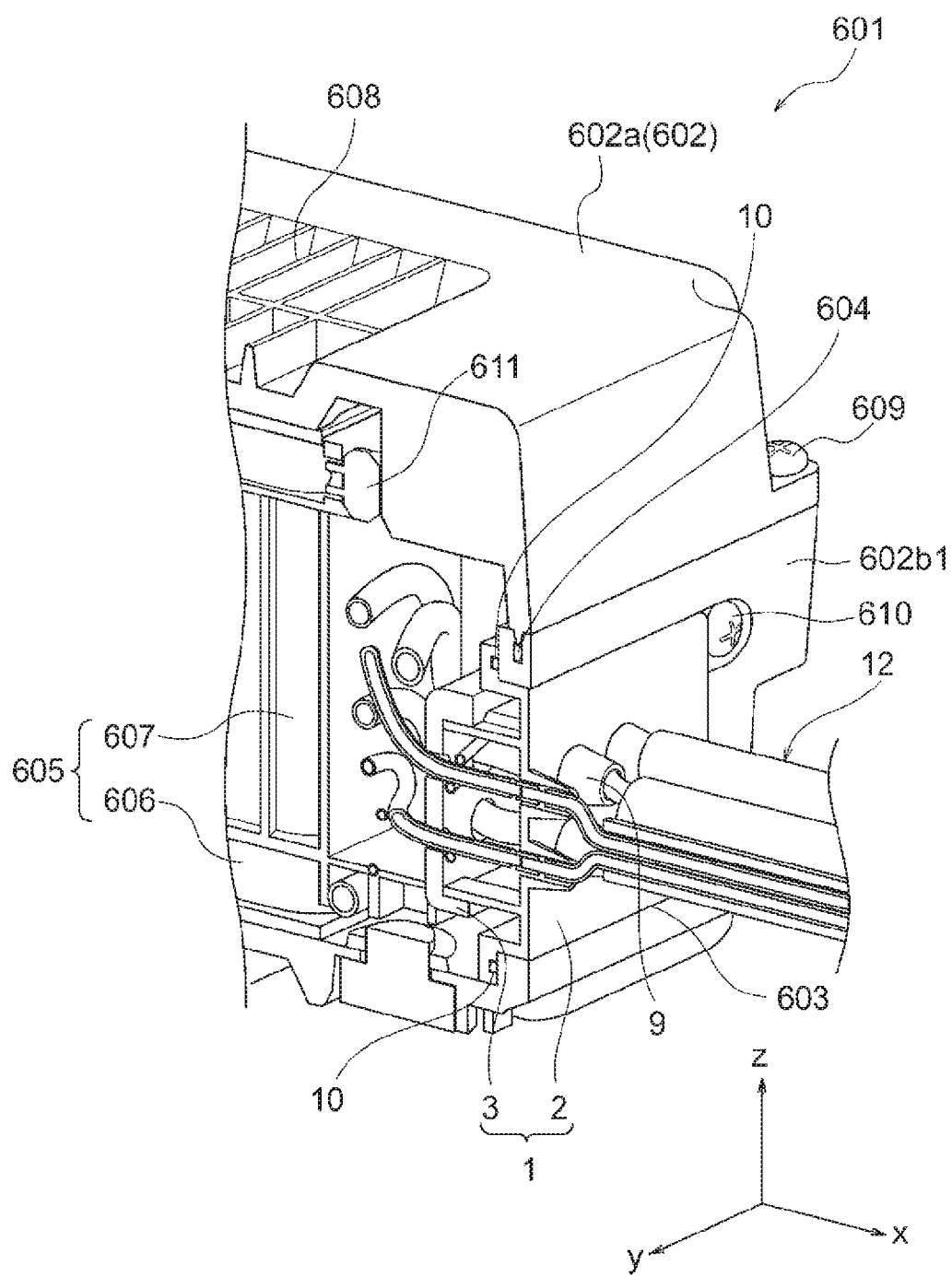
FIG. 26 is a sectional view of the battery pack according to the fifth embodiment of the present technology illustrated in FIG. 24, taken along line FF.

With reference to FIGS. 24 to 26, a battery pack 601 according to a fifth embodiment (example of a battery pack) of the present technology will be described. FIG. 24 is a perspective view of the battery pack 601. FIG. 25 is a sectional perspective view taken along line E-E illustrated in FIG. 24. FIG. 26 is a sectional perspective view taken along line F-F illustrated in FIG. 24.

The battery pack 601 includes at least a battery cell 607, and a battery pack case 602 accommodating the battery cell 607. The battery pack 601 may include at least a battery block 605 composed of a battery cell 607 and a battery holder 606 accommodating the battery cell 607, and a battery pack case 602 accommodating the battery block 605. The battery pack case 602 has a lead-out hole 603 for leading out wires 12. In the lead-out hole 603, the grommet according to the present technology is disposed. In FIGS. 24 to 26, the grommet 1 described above is disposed in the lead-out hole 603. Any one of the grommet 101, the grommet 201, and the grommet 301, described above, may be disposed in the lead-out hole 603. The battery pack case 602 is provided in its inside with a heat conductive member 4 (not illustrated) for releasing heat generated from the battery block to the outside, and a vibration-proof member 611 contributing to vibration isolation of the battery block. The battery block and the battery pack case 602 will be described below. In the battery pack according to the present technology, a configuration of the battery pack, such as the number of batteries and a connection form, can be appropriately changed depending on application of the battery pack.

The battery block 605 is composed of the battery cell 607 and the battery holder 606 in which a battery is housed. The battery cell 607 is not particularly limited, and a publicly known battery can be used. For example, the publicly known battery includes a primary battery such as a manganese dry battery, an alkali manganese dry battery, and a lithium primary battery, and a secondary battery such as a nickel-cadmium battery, a nickel-metal hydride battery, a nickel-zinc battery, a lead-acid battery, a lithium secondary battery, a lithium ion secondary battery, and a lithium ion polymer secondary battery. It is preferable that the battery pack according to the fifth embodiment of the present technology uses a lithium ion secondary battery (e.g., model number US18650 series made by Sony Corp.). When a lithium ion secondary battery with high energy density is used as the battery, a protection circuit (PCM) may be provided in the battery pack case 602 to ensure safety. The battery holder 606 is composed of a pair of half-cases that is substantially identical in shape to each other, and is formed in a substantially rectangular shape. The material of each of the half-cases is not particularly limited in material, and includes an insulating material such as plastic, for example.

The battery pack case 602 is composed of a pair of battery pack half-cases 602a (an upper half in the drawing) and 602b (a lower half in the drawing). The pair of battery pack half-cases 602a and 602b is assembled by fastening the screws 609 with an O-ring 605 for a battery pack case interposed therebetween. A method for assembling the pair of battery pack half-cases 602a and 602b is not particularly limited, and a publicly known method can be used.

As described above, the half-cases 602a and 602b are assembled with the O-ring 605 for a battery pack case interposed therebetween. Specifically, the O-ring 605 for a battery pack case is disposed between a fitting surface of the half-case 602a and a fitting surface of the half-case 602b. When the battery pack 601 is assembled, the O ring 605 is disposed between the fitting surface of the half-case 602a and the fitting surface of the half-case 602b while being elastically deformed. As a result, the O-ring 605 can prevent ingress of foreign matters such as water and dust into the battery pack case 602.

While the material used for forming the O-ring 605 for a battery pack case is not particularly limited as long as it can be elastically deformed, it is preferable that the material is similar to the specific material used for forming the O-ring 10 described above.

The battery pack case 602 is provided in its outer surface with heat-radiating portion 608 for releasing heat generated from the battery. The heat-radiating portion 608 has a structure in which fins each formed in a projecting shape are arranged along the longitudinal direction and the width direction of the battery pack 601 at predetermined intervals, and forms a so-called radiating fin structure.

As described above, the battery pack case 602 has the lead-out hole 603 for leading out the wires 12, and the grommet 1 is disposed in the lead-out hole 603. The lead-out hole 603 is provided for pulling out the wires 12 from the battery pack 601, and is formed in a side surface plate 602b1 of the half-case 602b of the battery pack case. The side surface plate 602b1 is one of side surface plates provided in the half-case 602b of the battery pack case, and is disposed at one end of the half-case 602b in its longitudinal direction while extending in the y-axis direction and the z-axis direction (perpendicular to the x-axis direction) in the drawing.

The grommet 1 is disposed in the lead-out hole 603 such that the protruding portion 13 of the second main surface 2b, provided with the protrusions 9 of the grommet 1, is positioned on the outer side of the battery pack 602, and the protruding portion 13 of the second main surface 2b, provided with the protrusions 9, serves as a design surface of the grommet 1. Thus, the lead-out hole 603 may have a size (area of the opening) substantially identical to a size (area) of the protruding portion 13. Then, the grommet 1 is assembled into the lead-out hole 603 of the battery pack case 602 such that the grommet 1 is pressed to bring the O-ring 10 disposed in the peripheral recessed portion 18 of the second main surface 2b into close contact with an inner wall of the battery pack case 602. The assembly as described above can contribute to improvement in waterproof property of the entire battery pack 601. The O-ring 10 is used for preventing ingress of water into an interface between the battery pack case 602 and the grommet 1, so that the grommet 1 is assembled into the battery pack case 602 by being pressed and fitted unlike a conventional structure in which rubber or elastomer is inserted into a lead-out hole (through-hole) while being squeezed. As a result, a degree of difficulty of assembling work does not depend on waterproof specifications.

An example of an electronic apparatus according to a sixth embodiment of the present technology includes the battery pack according to the fifth embodiment of the present technology as a power supply source.

The battery pack provided in the electronic apparatus according to the sixth embodiment of the present technology is as described above, and is the battery pack of the fifth embodiment illustrated in FIGS. 24 to 26. Thus, the description of the battery pack is eliminated here.

Examples of an electronic apparatus according to a sixth embodiment of the present technology include a notebook type personal computer, a portable information terminal (PDA), a cellular phone, a cordless phone handset, a video camera, a digital still camera, an electronic book, an electronic dictionary, a music player, a radio, a headphone, a game machine, a navigation system, a memory card, a pacemaker, a hearing aid, an electric tool, an electric shaver, a refrigerator, an air conditioner, a television, a stereo, a water heater, a microwave oven, a dishwasher, a washer, a drier, lighting equipment, a toy, medical equipment, a robot, a road conditioners, a traffic light, and the like.

The battery pack according to the fifth embodiment of the present technology can be used for supplying power to an electric vehicle of according to a seventh embodiment of the present technology. An example of the electric vehicle according to the seventh embodiment of the present technology includes the battery pack according to the fifth embodiment of the present technology, a converter that converts electric power supplied from the battery pack into driving force, a driving unit that is driven in accordance with the driving force, and a control unit that controls a usage mode of the battery pack. Examples of the electric vehicle include a railway vehicle, a golf cart, an electric cart, an electric automobile (including a hybrid automobile), and the like. The battery pack according to the fifth embodiment of the present technology is used as a power source or an auxiliary power source for driving the electric vehicles described above.

Figure 27:
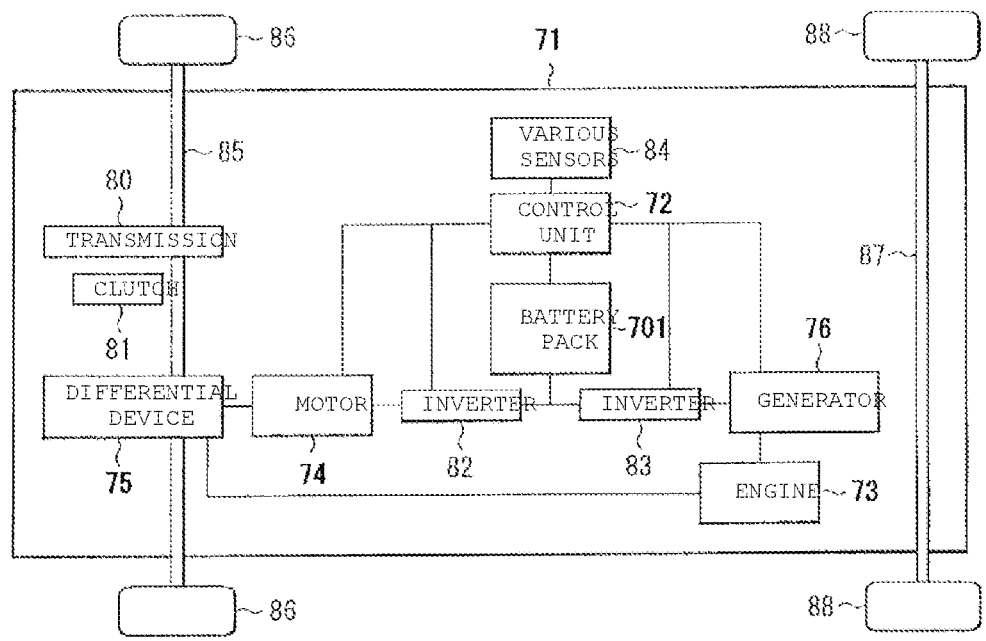
FIG. 27 is a block diagram illustrating a configuration of an example of an electric vehicle according to a seventh embodiment of the present technology.

FIG. 27 illustrates a block configuration of a hybrid car serving an example of an electric vehicle. The electric vehicle includes a metal body 71 provided in its inside with a control unit 72 (controller), an engine 73, a battery pack 701, a drive motor 74, a differential device 75, a generator 76, a transmission 80, a clutch 81, inverters 82 and 83, and various sensors 84, for example. Besides this, the electric vehicle includes a front wheel drive shaft 85 and a front wheel 86, which are connected to the differential device 75 and the transmission 80, and a rear wheel drive shaft 87 and a rear wheel 88, for example.

The electric vehicle can travel using any one of the engine 73 and the motor 74 as a drive source, for example. The engine 73 is a main power source such as a gasoline engine, for example. When the engine 73 is used as a power supply, for example, a driving force (rotational force) of the engine 73 is transmitted to the front wheel 86 or the rear wheel 88 using the differential device 75, the transmission 80, and the clutch 81 that are driving units. The rotational force of the engine 73 is transmitted to the generator 76. The generator 76 uses the rotational force to generate AC power. The AC power is converted into DC power using the inverter 83, and the DC power is accumulated in the battery pack 701. Meanwhile, when the motor 74 serving as a converter is used as a power supply, electric power (DC power) supplied from the battery pack 701 is converted into AC power using the inverter 82. Then, the motor 74 is driven by using the AC power. The driving force (rotational force) converted from the electric power by the motor 74 is transmitted to the front wheel 86 or the rear wheel 88 using the differential device 75, the transmission 80, and the clutch 81 that are driving units, for example.

When the electric vehicle decelerates using a braking mechanism (not illustrated), a resistance force at the time of deceleration is transmitted to the motor 74 as a rotational force. Thus, the motor 74 may be configured to generate AC power by using the rotational force. The AC power is converted into DC power using the inverter 82, and it is preferable that the DC regenerative power can be accumulated in the battery pack 701.

The control unit 72 controls operation of the entire electric vehicle, and includes a CPU, a processor and the like, for example.

The battery pack 701 may be connected to an external power supply to be able to accumulate electric power received from the external power supply. The various sensors 84 are used to control not only rotation speed of the engine 73, but also opening (throttle opening) of a throttle valve (not illustrated), for example. The various sensors 84 include a speed sensor, an acceleration sensor, an engine speed sensor, and the like, for example.

As the battery pack 701, the fifth embodiment illustrated in FIGS. 24 to 26 can be used. Thus, the description of the battery pack is eliminated here.

While a hybrid car is described as an electric vehicle, the electric vehicle may be a vehicle (electric automobile) that operates using only the battery pack 701 and the motor 74 without using the engine 73.

The battery pack according to the fifth embodiment of the present technology can also be used as a power storage power source for a power storage system according to an eighth embodiment of the present technology. An example of the power storage system according to the eighth embodiment of the present technology includes the battery pack of according to the fifth embodiment of the present technology, one or more electric apparatuses to which electric power is supplied from the battery pack, and a control unit that controls electric power supply to the electric apparatuses from the battery pack.

Figure 28:
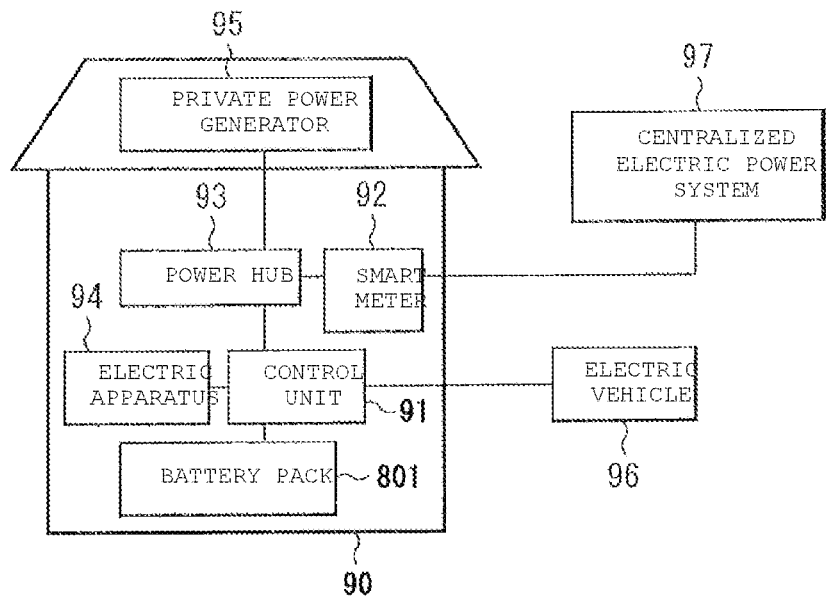
FIG. 28 is a block diagram illustrating a configuration of an example of an electric power storage system according to an eighth embodiment of the present technology.

FIG. 28 illustrates a block configuration of the electric power storage system. The power storage system includes a battery pack 801, a control unit 91, a smart meter 92, and a power hub 93, inside a house 90 such as a general residential building and a commercial building, for example.

The battery pack 801 is connected to an electric apparatus 94 installed inside the house 90, and is connectable to an electric vehicle 96 stopped outside the house 90, for example. The battery pack 801 is also connected to a private power generator 95 installed in the house 90 using the power hub 93, for example, and is connectable to an external centralized electric power system 97 via the smart meter 92 and the power hub 93. As the battery pack 801, the battery pack of the fifth embodiment illustrated in FIGS. 24 to 26 can be used. Thus, the description of the battery pack is eliminated here.

The electric apparatus 94 includes one or more home electric appliances, such as a refrigerator, an air conditioner, a television, a water heater, and the like. The private power generator 95 is any one or more kinds of solar power generator and wind power generator, for example. The electric vehicle 96 is any one or more kinds of electric automobile, electric bike, hybrid car, and the like, for example. The centralized electric power system 97 is any one or more kinds of thermal power plant, nuclear power plant, hydraulic power plant, wind power plant, and the like, for example.

The control unit 91 (controller) controls operation of the entire power storage system (including a usage mode of the battery pack 801), and includes a CPU, processor and the like, for example. The smart meter 92 is a network-compliant power meter installed in the house 90 of a consumer, and is capable of communicating with an electric power supplier, for example. Accordingly, the smart meter 92 controls balance between supply and demand of electric power in the house 90 while communicating with the outside, for example, thereby enabling efficient and stable supply of energy.

In the electric power storage system, electric power supplied from the centralized electric power system 97, serving as an external power source, via the smart meter 92 and the power hub 93 is accumulated in the battery pack 801, and electric power supplied from the private power generator 95, serving as an independent power source, via the power hub 93 is accumulated in the battery pack 801, for example. The electric power accumulated in the battery pack 801 is supplied to the electric apparatus 94 and the electric vehicle 96 according to an instruction of the control unit 91, so that the electric apparatus 94 can be operated and the electric vehicle 96 can be charged. That is, the electric power storage system enables accumulation and supply of electric power in the house 90 using the battery pack 801.

The electric power accumulated in the battery pack 801 can be arbitrarily used. For this reason, electric power supplied from the centralized electric power system 97 is accumulated in the battery pack 801 in the middle of the night when electricity charge is low to enable the electric power accumulated in the battery pack 801 to be used during the day when the electricity charge is high, for example.

The above-described electric power storage system may be installed for each house (one household), or may be installed for each plurality of houses (plurality of households).

The battery pack according to the fifth embodiment of the present technology can be used as a power source for a power tool according to a ninth embodiment of the present technology. An example of the electric tool according to the ninth embodiment of the present technology includes the battery pack according to the fifth embodiment of the present technology, and a movable part to which electric power is supplied from the battery pack. Examples of the electric tool include an electric drill, an electric saw, a rolling machine such as a rammer, an electric agricultural machine such as a lawn mower, and the like.

Figure 29:
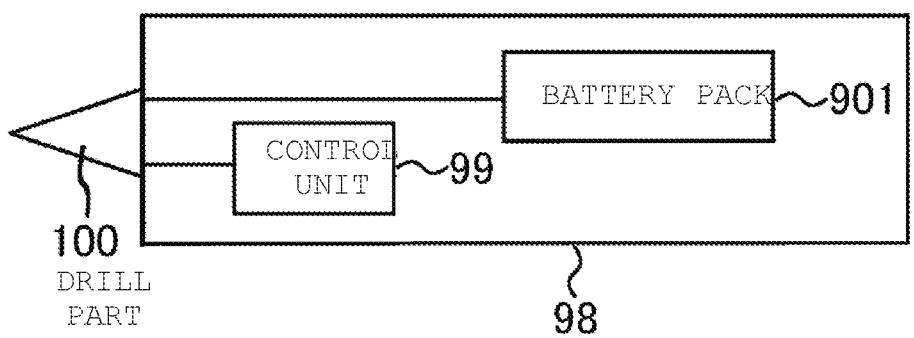
FIG. 29 is a block diagram illustrating a configuration of an example of an electric power tool according to a ninth embodiment of the present technology.

FIG. 29 illustrates a block configuration of the electric tool. The electric power tool is an electric drill, for example, and includes a control unit 99 and a battery pack 901 inside a tool body 98 formed of a plastic material or the like. The tool body 98 is provided with a drill part 100 serving as the movable part that is attached in an operable (rotatable) manner, for example.

The control unit 99 (controller) controls operation of the entire electric tool (including a usage mode of the battery pack 901), and includes a CPU, a processor and the like, for example. The control unit 99 causes the battery pack 901 to supply electric power to a drill part 100 according to operation of an operation switch (not illustrated).

As the battery pack 901, the battery pack of the fifth embodiment illustrated in FIGS. 24 to 26 can be used. Thus, the description of the battery pack is eliminated here.

The present technology is described below in further detail according to an embodiment.

[1]

A grommet including:

a pedestal;

and a wire fixing portion for fixing a wire, wherein each of the pedestal and the wire fixing portion has at least one hole through which the wire is inserted, and the pedestal has a pool portion into which a resin agent is poured and cured.

[2]

The grommet according to aspect [1], wherein the pool portion includes an outer trench.

[3]

The grommet according to aspect [1] or [2], further including at least one protrusion through which the wire is inserted, wherein the protrusion is formed on a second main surface opposite to a first main surface of the pedestal in which the pool portion is formed.

[4]

The grommet according to any one of aspects [1] or [3], further including a waterproof member, wherein the waterproof member is disposed in a periphery of the second main surface opposite to the first main surface of the pedestal on which the pool portion is formed.

[5]
The grommet according to any one of aspects [1] to [4], wherein
the pedestal includes at least one holding member for holding the wire, and
the at least one holding member is provided around the at least one hole of the pedestal.

[6]
The grommet according to any one of aspects [1] to [5], wherein each of the pedestal and the wire fixing member is made of a hard material.

[7]
The grommet according to any one of aspects [1] to [6], wherein the wire fixing member is a first cover member for covering the pool portion.

[8]
The grommet according to any one of aspects [1] to [6], wherein the wire fixing member is a second cover member for covering the pool portion, having an opening through which the resin agent is poured.

[9]
The grommet according to any one of aspects [1] to [6], wherein
the wire fixing member is a third cover member for covering the pool portion,
an integrally molded body in which the pedestal and the third cover part are integrally molded is provided, and
the integrally molded body has an opening through which the resin agent is poured.

[10]
The grommet according to any one of aspects [1] to [6], wherein the wire fixing member is composed of at least one supporting structure for supporting the wire.

[11]
A battery pack including at least a battery cell and a battery pack case accommodating the battery cell, wherein
the battery pack case has a lead-out hole for leading out a wire, in which a grommet is disposed,
the grommet has a pedestal, and a wire fixing member for fixing a wire, each of which has at least one hole through which the wire is inserted, and
the pedestal has a pool portion into which a resin agent is poured and cured.

[12]
The battery pack according to aspect [11], wherein the pool portion includes an outer trench.

[13]
The battery pack according to aspect [11] or [12], wherein
the grommet includes at least one protrusion through which the wire is inserted, and
the protrusion is formed on a second main surface opposite to a first main surface of the pedestal in which the pool portion is formed.

[14]
The battery pack according to any one of aspects [11] to [13], wherein
the grommet includes a waterproof member that is disposed in a periphery of the second main surface opposite to the first main surface of the pedestal in which the pool portion is formed, and
the waterproof member is interposed between the grommet and the battery pack case.

[15]
The battery pack according to any one of aspects [11] to [14], wherein
the pedestal includes at least one holding member for holding the wire, and
the at least one holding member is provided around the at least one hole of the pedestal.

[16]
The battery pack according to any one of aspects [11] to [15], wherein each of the pedestal and the wire fixing member is made of a hard material.

[17]
The battery pack according to any one of aspects [11] to [16], wherein the wire fixing member is a first cover member for covering the pool portion.

[18]
The battery pack according to any one of aspects [11] to [16], wherein the wire fixing member is a second cover member for covering the pool portion, having an opening through which the resin agent is poured.

[19]
The battery pack according to any one of aspects [11] to [16], wherein
the wire fixing member is a third cover member for covering the pool portion,
an integrally molded body in which the pedestal and the third cover part are integrally molded is provided, and
the integrally molded body has an opening through which the resin agent is poured.

[20]
The battery pack according to any one of aspects [11] to [16], wherein the wire fixing member is composed of at least one supporting structure for supporting the wire.

[21]
An electronic apparatus including the battery pack according to any one of aspects [11] to [20] as a power supply source.

[22]
An electric vehicle including:
the battery pack according to any one of aspects [11] to [20];
a converter that converts electric power supplied from the battery pack into driving force;
a driving unit that is driven in accordance with the driving force; and
a control unit that controls a usage mode of the battery pack.

[23]
A power storage system including:
the battery pack according to any one of aspects [11] to [20];
one or more electric apparatuses to which electric power is supplied from the battery pack; and
a control unit that controls electric power supply to the electric apparatuses from the battery pack.

[24]
An electric tool including:
the battery pack according to any one of aspects [11] to [20]; and
a movable part to which electric power is supplied from the battery pack.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
   at least a battery cell; and a battery pack case accommodating the battery cell,
   wherein
   the battery pack case has a lead-out hole for leading out a wire, in which a grommet is disposed,
   the grommet has a pedestal, and a wire fixing member configured to fix a wire, each of the pedestal and the wire fixing member has at least one hole through which the wire is configured to be inserted, and
   the pedestal has a pool portion configured to accommodate a resin agent,
   wherein the pool portion includes side surface plates for partitioning the pool portion, and
   wherein the resin agent is filled up to the top of the side surface plates of the pool portion.

2. The battery pack according to claim 1, wherein the pool portion includes an outer trench.

3. The battery pack according to claim 1, wherein
   the grommet includes at least one protrusion through which the wire is configured to be inserted, and
   the protrusion is formed on a second main surface opposite to a first main surface of the pedestal.

4. The battery pack according to claim 1, wherein
   the grommet includes a waterproof member that is disposed in a periphery of a second main surface opposite to a first main surface of the pedestal, and
   the waterproof member is interposed between the grommet and the battery pack case.

5. The battery pack according to claim 1, wherein each of the pedestal and the wire fixing member includes a hard material.

6. The battery pack to claim 1, wherein the wire fixing member includes a first cover member configured to cover the pool portion.

7. The battery pack according to claim 1, wherein the wire fixing member includes a second cover member configured to cover the pool portion, and wherein the second cover member includes an opening through which the resin agent is configured to be poured.

8. The battery pack according to claim 1, wherein
   the wire fixing member includes a third cover member configured to cover the pool portion,
   the pedestal and the third cover member are integrally molded as an integrally molded body, and
   the integrally molded body has an opening through which the resin agent is configured to be poured.

9. The battery pack according to claim 1, wherein the wire fixing member includes at least one supporting structure configured to support the wire.

10. An electronic apparatus comprising the battery pack according to claim 1 as a power supply source.

* * * * *